(12) United States Patent
Baik et al.

(10) Patent No.: US 9,055,468 B2
(45) Date of Patent: Jun. 9, 2015

(54) FRAME FORMATS AND TIMING PARAMETERS IN SUB-1 GHZ NETWORKS

(71) Applicant: Qualcomm Incorporated, San Diego, CA (US)

(72) Inventors: Eugene J Baik, San Diego, CA (US); Sameer Vermani, San Diego, CA (US)

(*) Notice: Subject to any disclaimer, the term of this patent is extended or adjusted under 35 U.S.C. 154(b) by 189 days.

(21) Appl. No.: 13/782,451

(22) Filed: Mar. 1, 2013

(65) Prior Publication Data

US 2013/0315262 A1 Nov. 28, 2013

Related U.S. Application Data

(60) Provisional application No. 61/619,338, filed on Apr. 2, 2012.

(51) Int. Cl.
*H04W 28/02* (2009.01)
*H04L 27/26* (2006.01)
*H04L 5/00* (2006.01)

(52) U.S. Cl.
CPC ....... *H04W 28/0273* (2013.01); *H04L 27/2602* (2013.01); *H04L 27/2613* (2013.01); *H04L 5/0023* (2013.01); *H04L 5/0046* (2013.01); *H04L 5/0091* (2013.01); *H04L 27/2607* (2013.01)

(58) Field of Classification Search
None
See application file for complete search history.

(56) References Cited

U.S. PATENT DOCUMENTS

| 2010/0260159 | A1 | 10/2010 | Zhang et al. | |
| 2011/0255620 | A1 | 10/2011 | Jones, IV et al. | |
| 2012/0195391 | A1* | 8/2012 | Zhang et al. | 375/295 |
| 2012/0236971 | A1 | 9/2012 | Nasrabadi et al. | |
| 2012/0263211 | A1 | 10/2012 | Porat et al. | |
| 2012/0269123 | A1 | 10/2012 | Porat et al. | |
| 2012/0269124 | A1 | 10/2012 | Porat | |
| 2012/0269125 | A1 | 10/2012 | Porat et al. | |
| 2012/0294294 | A1 | 11/2012 | Zhang | |
| 2012/0324315 | A1 | 12/2012 | Zhang et al. | |
| 2012/0327871 | A1 | 12/2012 | Ghosh et al. | |
| 2013/0016694 | A1 | 1/2013 | Nimbalker et al. | |
| 2013/0114757 | A1* | 5/2013 | Park et al. | 375/295 |
| 2013/0155952 | A1* | 6/2013 | Chu et al. | 370/328 |
| 2014/0247838 | A1* | 9/2014 | Seok et al. | 370/476 |
| 2014/0286455 | A1* | 9/2014 | Choi et al. | 375/308 |

OTHER PUBLICATIONS

International Search Report and Written Opinion—PCT/US2013/031329—ISA/EPO—Aug. 23, 2013.
Song, J.H., "IEEE P802.11 Wireless LANs—Clause 19 Changes for Sub 10 MHz Channel Widths for HT Operation", Nov. 2010, 31 pp.
Park, M., Wireless LANs—Proposed Specification Framework for TGah, doc.: IEEE802.11-11/1137r13, Jan. 2013, 58 pp.
Park, M., Wireless LANs—Proposed Specification Framework for TGah Da0.x, doc.: IEEE802.11-12/1158r0, Sep. 2012, 36 pp.
Wicaksana, H., "Clarifications on 1 Mhz Preamble and Timing-Related Constants", doc.: IEEE 802.11-12/1363r1, Nov. 2012, 12 pp.

* cited by examiner

*Primary Examiner* — Otis L Thompson, Jr.
(74) *Attorney, Agent, or Firm* — S. Hossain Beladi

(57) ABSTRACT

Systems and methods of controlling characteristics of messages in sub-1 GHz networks (e.g., IEEE 802.11ah networks) are disclosed. One or more data structures indicating available frame formats and/or timing parameters may be stored at or accessible to transmitters and receivers. The data structures may be organized based on a frame format, a wireless network bandwidth, and/or the number of spatial streams in use at the wireless network. Information stored in the data structures may be used in generation and processing of messages communicated via the sub-1 GHz network.

19 Claims, 41 Drawing Sheets

1 MHz, 1 Spatial Stream - Option 1

| MCS Idx | Mod | R | N_bpscs | N_sd | N_sp | N_cbps | N_dbps | N_es | Data rate (Kbps) 8us GI | Data rate (Kbps) 4us GI |
|---|---|---|---|---|---|---|---|---|---|---|
| 0 | BPSK | 1/4 | 1 | 24 | 2 | 24 | 6 | 1 | 150.0 | 166.7 |
| 1 | BPSK | 1/2 | 1 | 24 | 2 | 24 | 12 | 1 | 300.0 | 333.3 |
| 2 | QPSK | 1/2 | 2 | 24 | 2 | 48 | 24 | 1 | 600.0 | 666.7 |
| 3 | QPSK | 3/4 | 2 | 24 | 2 | 48 | 36 | 1 | 900.0 | 1000.0 |
| 4 | 16-QAM | 1/2 | 4 | 24 | 2 | 96 | 48 | 1 | 1200.0 | 1333.3 |
| 5 | 16-QAM | 3/4 | 4 | 24 | 2 | 96 | 72 | 1 | 1800.0 | 2000.0 |
| 6 | 64-QAM | 2/3 | 6 | 24 | 2 | 144 | 96 | 1 | 2400.0 | 2666.7 |
| 7 | 64-QAM | 3/4 | 6 | 24 | 2 | 144 | 108 | 1 | 2700.0 | 3000.0 |
| 8 | 64-QAM | 5/6 | 6 | 24 | 2 | 144 | 120 | 1 | 3000.0 | 3333.3 |
| 9 | 256-QAM | 3/4 | 8 | 24 | 2 | 192 | 144 | 1 | 3600.0 | 4000.0 |
| 10 | 256-QAM | 5/6 | 8 | 24 | 2 | 192 | 160 | 1 | 4000.0 | 4444.4 |

MCS Idx = MCS Index
Mod = Modulation Scheme
R = Coding Rate
N_sd = # data symbols
N_sp = # pilot symbols N_bpscs = # bits per subcarrier symbol
N_cbps = # coded bits per OFDM symbol
N_dbps = # data bits per OFDM symbol
N_es = # encoders used
GI = Guard Interval

FIG. 2A

1 MHz, 1 Spatial Stream - Option 2

| MCS Idx | Mod | R | N_bpscs | N_sd | N_sp | N_cbps | N_dbps | N_es | Data rate (Kbps) 8us GI | Data rate (Kbps) 4us GI |
|---|---|---|---|---|---|---|---|---|---|---|
| 0 | BPSK | 1/2 | 1 | 24 | 2 | 24 | 12 | 1 | 300.0 | 333.3 |
| 1 | QPSK | 1/2 | 2 | 24 | 2 | 48 | 24 | 1 | 600.0 | 666.7 |
| 2 | QPSK | 3/4 | 2 | 24 | 2 | 48 | 36 | 1 | 900.0 | 1000.0 |
| 3 | 16-QAM | 1/2 | 4 | 24 | 2 | 96 | 48 | 1 | 1200.0 | 1333.3 |
| 4 | 16-QAM | 3/4 | 4 | 24 | 2 | 96 | 72 | 1 | 1800.0 | 2000.0 |
| 5 | 64-QAM | 2/3 | 6 | 24 | 2 | 144 | 96 | 1 | 2400.0 | 2666.7 |
| 6 | 64-QAM | 3/4 | 6 | 24 | 2 | 144 | 108 | 1 | 2700.0 | 3000.0 |
| 7 | 64-QAM | 5/6 | 6 | 24 | 2 | 144 | 120 | 1 | 3000.0 | 3333.3 |
| 8 | 256-QAM | 3/4 | 8 | 24 | 2 | 192 | 144 | 1 | 3600.0 | 4000.0 |
| 9 | 256-QAM | 5/6 | 8 | 24 | 2 | 192 | 160 | 1 | 4000.0 | 4444.4 |
| 10 | BPSK | 1/4 | 1 | 24 | 2 | 24 | 6 | 1 | 150.0 | 166.7 |

FIG. 2B

1 MHz, 1 Spatial Stream - Option 3

| MCS Idx | Mod | R | N_bpscs | N_sd | N_sp | N_cbps | N_dbps | N_es | Data rate (Kbps) 8us GI | Data rate (Kbps) 4us GI |
|---|---|---|---|---|---|---|---|---|---|---|
| 0 | BPSK | 1/2 | 1 | 24 | 2 | 24 | 12 | 1 | 300.0 | 333.3 |
| 1 | QPSK | 1/2 | 2 | 24 | 2 | 48 | 24 | 1 | 600.0 | 666.7 |
| 2 | QPSK | 3/4 | 2 | 24 | 2 | 48 | 36 | 1 | 900.0 | 1000.0 |
| 3 | 16-QAM | 1/2 | 4 | 24 | 2 | 96 | 48 | 1 | 1200.0 | 1333.3 |
| 4 | 16-QAM | 3/4 | 4 | 24 | 2 | 96 | 72 | 1 | 1800.0 | 2000.0 |
| 5 | 64-QAM | 2/3 | 6 | 24 | 2 | 144 | 96 | 1 | 2400.0 | 2666.7 |
| 6 | 64-QAM | 3/4 | 6 | 24 | 2 | 144 | 108 | 1 | 2700.0 | 3000.0 |
| 7 | 64-QAM | 5/6 | 6 | 24 | 2 | 144 | 120 | 1 | 3000.0 | 3333.3 |
| 8 | 256-QAM | 3/4 | 8 | 24 | 2 | 192 | 144 | 1 | 3600.0 | 4000.0 |
| 9 | 256-QAM | 5/6 | 8 | 24 | 2 | 192 | 160 | 1 | 4000.0 | 4444.4 |
| 15 | BPSK | 1/4 | 1 | 24 | 2 | 24 | 6 | 1 | 150.0 | 166.7 |

FIG. 2C

1 MHz, 2 Spatial Streams

| MCS Idx | Mod | R | N_bpscs | N_sd | N_sp | N_cbps | N_dbps | N_es | Data rate (Kbps) 8us GI | Data rate (Kbps) 4us GI |
|---|---|---|---|---|---|---|---|---|---|---|
| 0 | BPSK | 1/2 | 1 | 24 | 2 | 48 | 24 | 1 | 600.0 | 666.7 |
| 1 | QPSK | 1/2 | 2 | 24 | 2 | 96 | 48 | 1 | 1200.0 | 1333.3 |
| 2 | QPSK | 3/4 | 2 | 24 | 2 | 96 | 72 | 1 | 1800.0 | 2000.0 |
| 3 | 16-QAM | 1/2 | 4 | 24 | 2 | 192 | 96 | 1 | 2400.0 | 2666.7 |
| 4 | 16-QAM | 3/4 | 4 | 24 | 2 | 192 | 144 | 1 | 3600.0 | 4000.0 |
| 5 | 64-QAM | 2/3 | 6 | 24 | 2 | 288 | 192 | 1 | 4800.0 | 5333.3 |
| 6 | 64-QAM | 3/4 | 6 | 24 | 2 | 288 | 216 | 1 | 5400.0 | 6000.0 |
| 7 | 64-QAM | 5/6 | 6 | 24 | 2 | 288 | 240 | 1 | 6000.0 | 6666.7 |
| 8 | 256-QAM | 3/4 | 8 | 24 | 2 | 384 | 288 | 1 | 7200.0 | 8000.0 |
| 9 | 256-QAM | 5/6 | 8 | 24 | 2 | 384 | 320 | 1 | 8000.0 | 8888.9 |

FIG. 3A

1 MHz, 3 Spatial Streams

| MCS Idx | Mod | R | N_bpscs | N_sd | N_sp | N_cbps | N_dbps | N_es | Data_rate (Kbps) | |
|---|---|---|---|---|---|---|---|---|---|---|
| | | | | | | | | | 8us GI | 4us GI |
| 0 | BPSK | 1/2 | 1 | 24 | 2 | 72 | 36 | 1 | 900.0 | 1000.0 |
| 1 | QPSK | 1/2 | 2 | 24 | 2 | 144 | 72 | 1 | 1800.0 | 2000.0 |
| 2 | QPSK | 3/4 | 2 | 24 | 2 | 144 | 108 | 1 | 2700.0 | 3000.0 |
| 3 | 16-QAM | 1/2 | 4 | 24 | 2 | 288 | 144 | 1 | 3600.0 | 4000.0 |
| 4 | 16-QAM | 3/4 | 4 | 24 | 2 | 288 | 216 | 1 | 5400.0 | 6000.0 |
| 5 | 64-QAM | 2/3 | 6 | 24 | 2 | 432 | 288 | 1 | 7200.0 | 8000.0 |
| 6 | 64-QAM | 3/4 | 6 | 24 | 2 | 432 | 324 | 1 | 8100.0 | 9000.0 |
| 7 | 64-QAM | 5/6 | 6 | 24 | 2 | 432 | 360 | 1 | 9000.0 | 10000.0 |
| 8 | 256-QAM | 3/4 | 8 | 24 | 2 | 576 | 432 | 1 | 10800.0 | 12000.0 |
| 9 | 256-QAM | 5/6 | 8 | 24 | 2 | 576 | 480 | 1 | 12000.0 | 13333.3 |

*FIG. 3B*

1 MHz, 4 Spatial Streams

| MCS Idx | Mod | R | N_bpscs | N_sd | N_sp | N_cbps | N_dbps | N_es | Data_rate (Kbps) | |
|---|---|---|---|---|---|---|---|---|---|---|
| | | | | | | | | | 8us GI | 4us GI |
| 0 | BPSK | 1/2 | 1 | 24 | 2 | 96 | 48 | 1 | 1200.0 | 1333.3 |
| 1 | QPSK | 1/2 | 2 | 24 | 2 | 192 | 96 | 1 | 2400.0 | 2666.7 |
| 2 | QPSK | 3/4 | 2 | 24 | 2 | 192 | 144 | 1 | 3600.0 | 4000.0 |
| 3 | 16-QAM | 1/2 | 4 | 24 | 2 | 384 | 192 | 1 | 4800.0 | 5333.3 |
| 4 | 16-QAM | 3/4 | 4 | 24 | 2 | 384 | 288 | 1 | 7200.0 | 8000.0 |
| 5 | 64-QAM | 2/3 | 6 | 24 | 2 | 576 | 384 | 1 | 9600.0 | 10666.7 |
| 6 | 64-QAM | 3/4 | 6 | 24 | 2 | 576 | 432 | 1 | 10800.0 | 12000.0 |
| 7 | 64-QAM | 5/6 | 6 | 24 | 2 | 576 | 480 | 1 | 12000.0 | 13333.3 |
| 8 | 256-QAM | 3/4 | 8 | 24 | 2 | 768 | 576 | 1 | 14400.0 | 16000.0 |
| 9 | 256-QAM | 5/6 | 8 | 24 | 2 | 768 | 640 | 1 | 16000.0 | 17777.8 |

FIG. 3C

2 MHz, 1 Spatial Stream

| MCS Idx | Mod | R | N_bpscs | N_sd | N_sp | N_cbps | N_dbps | N_es | Data rate (Kbps) 8us GI | Data rate (Kbps) 4us GI |
|---|---|---|---|---|---|---|---|---|---|---|
| 0 | BPSK | 1/2 | 1 | 52 | 4 | 52 | 26 | 1 | 650.0 | 722.2 |
| 1 | QPSK | 1/2 | 2 | 52 | 4 | 104 | 52 | 1 | 1300.0 | 1444.4 |
| 2 | QPSK | 3/4 | 2 | 52 | 4 | 104 | 78 | 1 | 1950.0 | 2166.7 |
| 3 | 16-QAM | 1/2 | 4 | 52 | 4 | 208 | 104 | 1 | 2600.0 | 2888.9 |
| 4 | 16-QAM | 3/4 | 4 | 52 | 4 | 208 | 156 | 1 | 3900.0 | 4333.3 |
| 5 | 64-QAM | 2/3 | 6 | 52 | 4 | 312 | 208 | 1 | 5200.0 | 5777.8 |
| 6 | 64-QAM | 3/4 | 6 | 52 | 4 | 312 | 234 | 1 | 5850.0 | 6500.0 |
| 7 | 64-QAM | 5/6 | 6 | 52 | 4 | 312 | 260 | 1 | 6500.0 | 7222.2 |
| 8 | 256-QAM | 3/4 | 8 | 52 | 4 | 416 | 312 | 1 | 7800.0 | 8666.7 |
| 9 | 256-QAM | 5/6 | 8 | 52 | 4 | 416 | 346 2/3 | 1 | 8666.7 | 9629.6 |

FIG. 4A

2 MHz, 2 Spatial Streams

| MCS Idx | Mod | R | N_bpscs | N_sd | N_sp | N_cbps | N_dbps | N_es | Data rate (Kbps) 8us GI | 4us GI |
|---|---|---|---|---|---|---|---|---|---|---|
| 0 | BPSK | 1/2 | 1 | 52 | 4 | 104 | 52 | 1 | 1300.0 | 1444.4 |
| 1 | QPSK | 1/2 | 2 | 52 | 4 | 208 | 104 | 1 | 2600.0 | 2888.9 |
| 2 | QPSK | 3/4 | 2 | 52 | 4 | 208 | 156 | 1 | 3900.0 | 4333.3 |
| 3 | 16-QAM | 1/2 | 4 | 52 | 4 | 416 | 208 | 1 | 5200.0 | 5777.8 |
| 4 | 16-QAM | 3/4 | 4 | 52 | 4 | 416 | 312 | 1 | 7800.0 | 8666.7 |
| 5 | 64-QAM | 2/3 | 6 | 52 | 4 | 624 | 416 | 1 | 10400.0 | 11555.6 |
| 6 | 64-QAM | 3/4 | 6 | 52 | 4 | 624 | 468 | 1 | 11700.0 | 13000.0 |
| 7 | 64-QAM | 5/6 | 6 | 52 | 4 | 624 | 520 | 1 | 13000.0 | 14444.4 |
| 8 | 256-QAM | 3/4 | 8 | 52 | 4 | 832 | 624 | 1 | 15600.0 | 17333.3 |
| 9 | 256-QAM | 5/6 | 8 | 52 | 4 | 832 | 693 1/3 | 1 | 17333.3 | 19259.3 |

*FIG. 4B*

2 MHz, 3 Spatial Streams

| MCS Idx | Mod | R | N_bpscs | N_sd | N_sp | N_cbps | N_dbps | N_es | Data rate (Kbps) | |
|---|---|---|---|---|---|---|---|---|---|---|
| | | | | | | | | | 8us GI | 4us GI |
| 0 | BPSK | 1/2 | 1 | 52 | 4 | 156 | 78 | 1 | 1950.0 | 2166.7 |
| 1 | QPSK | 1/2 | 2 | 52 | 4 | 312 | 156 | 1 | 3900.0 | 4333.3 |
| 2 | QPSK | 3/4 | 2 | 52 | 4 | 312 | 234 | 1 | 5850.0 | 6500.0 |
| 3 | 16-QAM | 1/2 | 4 | 52 | 4 | 624 | 312 | 1 | 7800.0 | 8666.7 |
| 4 | 16-QAM | 3/4 | 4 | 52 | 4 | 624 | 468 | 1 | 11700.0 | 13000.0 |
| 5 | 64-QAM | 2/3 | 6 | 52 | 4 | 936 | 624 | 1 | 15600.0 | 17333.3 |
| 6 | 64-QAM | 3/4 | 6 | 52 | 4 | 936 | 702 | 1 | 17550.0 | 19500.0 |
| 7 | 64-QAM | 5/6 | 6 | 52 | 4 | 936 | 780 | 1 | 19500.0 | 21666.7 |
| 8 | 256-QAM | 3/4 | 8 | 52 | 4 | 1248 | 936 | 1 | 23400.0 | 26000.0 |
| 9 | 256-QAM | 5/6 | 8 | 52 | 4 | 1248 | 1040 | 1 | 26000.0 | 28888.9 |

*FIG. 4C*

2 MHz, 4 Spatial Streams

| MCS Idx | Mod | R | N_bpscs | N_sd | N_sp | N_cbps | N_dbps | N_es | Data rate (Kbps) 8us GI | Data rate (Kbps) 4us GI |
|---|---|---|---|---|---|---|---|---|---|---|
| 0 | BPSK | 1/2 | 1 | 52 | 4 | 208 | 104 | 1 | 2600.0 | 2888.9 |
| 1 | QPSK | 1/2 | 2 | 52 | 4 | 416 | 208 | 1 | 5200.0 | 5777.8 |
| 2 | QPSK | 3/4 | 2 | 52 | 4 | 416 | 312 | 1 | 7800.0 | 8666.7 |
| 3 | 16-QAM | 1/2 | 4 | 52 | 4 | 832 | 416 | 1 | 10400.0 | 11555.6 |
| 4 | 16-QAM | 3/4 | 4 | 52 | 4 | 832 | 624 | 1 | 15600.0 | 17333.3 |
| 5 | 64-QAM | 2/3 | 6 | 52 | 4 | 1248 | 832 | 1 | 20800.0 | 23111.1 |
| 6 | 64-QAM | 3/4 | 6 | 52 | 4 | 1248 | 936 | 1 | 23400.0 | 26000.0 |
| 7 | 64-QAM | 5/6 | 6 | 52 | 4 | 1248 | 1040 | 1 | 26000.0 | 28888.9 |
| 8 | 256-QAM | 3/4 | 8 | 52 | 4 | 1664 | 1248 | 1 | 31200.0 | 34666.7 |
| 9 | 256-QAM | 5/6 | 8 | 52 | 4 | 1664 | 1386.2/3 | 1 | 34666.7 | 38518.5 |

FIG. 4D

4 MHz, 1 Spatial Stream

| MCS Idx | Mod | R | N_bpscs | N_sd | N_sp | N_cbps | N_dbps | N_es | Data rate (Kbps) | |
|---|---|---|---|---|---|---|---|---|---|---|
| | | | | | | | | | 8us GI | 4us GI |
| 0 | BPSK | 1/2 | 1 | 108 | 6 | 108 | 54 | 1 | 1350.0 | 1500.0 |
| 1 | QPSK | 1/2 | 2 | 108 | 6 | 216 | 108 | 1 | 2700.0 | 3000.0 |
| 2 | QPSK | 3/4 | 2 | 108 | 6 | 216 | 162 | 1 | 4050.0 | 4500.0 |
| 3 | 16-QAM | 1/2 | 4 | 108 | 6 | 432 | 216 | 1 | 5400.0 | 6000.0 |
| 4 | 16-QAM | 3/4 | 4 | 108 | 6 | 432 | 324 | 1 | 8100.0 | 9000.0 |
| 5 | 64-QAM | 2/3 | 6 | 108 | 6 | 648 | 432 | 1 | 10800.0 | 12000.0 |
| 6 | 64-QAM | 3/4 | 6 | 108 | 6 | 648 | 486 | 1 | 12150.0 | 13500.0 |
| 7 | 64-QAM | 5/6 | 6 | 108 | 6 | 648 | 540 | 1 | 13500.0 | 15000.0 |
| 8 | 256-QAM | 3/4 | 8 | 108 | 6 | 864 | 648 | 1 | 16200.0 | 18000.0 |
| 9 | 256-QAM | 5/6 | 8 | 108 | 6 | 864 | 720 | 1 | 18000.0 | 20000.0 |

FIG. 5A

4 MHz, 2 Spatial Streams

| MCS Idx | Mod | R | N_bpscs | N_sd | N_sp | N_cbps | N_dbps | N_es | Data rate (Kbps) 8us GI | 4us GI |
|---|---|---|---|---|---|---|---|---|---|---|
| 0 | BPSK | 1/2 | 1 | 108 | 6 | 216 | 108 | 1 | 2700.0 | 3000.0 |
| 1 | QPSK | 1/2 | 2 | 108 | 6 | 432 | 216 | 1 | 5400.0 | 6000.0 |
| 2 | QPSK | 3/4 | 2 | 108 | 6 | 432 | 324 | 1 | 8100.0 | 9000.0 |
| 3 | 16-QAM | 1/2 | 4 | 108 | 6 | 864 | 432 | 1 | 10800.0 | 12000.0 |
| 4 | 16-QAM | 3/4 | 4 | 108 | 6 | 864 | 648 | 1 | 16200.0 | 18000.0 |
| 5 | 64-QAM | 2/3 | 6 | 108 | 6 | 1296 | 864 | 1 | 21600.0 | 24000.0 |
| 6 | 64-QAM | 3/4 | 6 | 108 | 6 | 1296 | 972 | 1 | 24300.0 | 27000.0 |
| 7 | 64-QAM | 5/6 | 6 | 108 | 6 | 1296 | 1080 | 1 | 27000.0 | 30000.0 |
| 8 | 256-QAM | 3/4 | 8 | 108 | 6 | 1728 | 1296 | 1 | 32400.0 | 36000.0 |
| 9 | 256-QAM | 5/6 | 8 | 108 | 6 | 1728 | 1440 | 1 | 36000.0 | 40000.0 |

*FIG. 5B*

4 MHz, 3 Spatial Streams

| MCS Idx | Mod | R | N_bpscs | N_sd | N_sp | N_cbps | N_dbps | N_es | Data_rate (Kbps) 8us GI | Data_rate (Kbps) 4us GI |
|---|---|---|---|---|---|---|---|---|---|---|
| 0 | BPSK | 1/2 | 1 | 108 | 6 | 324 | 162 | 1 | 4050.0 | 4500.0 |
| 1 | QPSK | 1/2 | 2 | 108 | 6 | 648 | 324 | 1 | 8100.0 | 9000.0 |
| 2 | QPSK | 3/4 | 2 | 108 | 6 | 648 | 486 | 1 | 12150.0 | 13500.0 |
| 3 | 16-QAM | 1/2 | 4 | 108 | 6 | 1296 | 648 | 1 | 16200.0 | 18000.0 |
| 4 | 16-QAM | 3/4 | 4 | 108 | 6 | 1296 | 972 | 1 | 24300.0 | 27000.0 |
| 5 | 64-QAM | 2/3 | 6 | 108 | 6 | 1944 | 1296 | 1 | 32400.0 | 36000.0 |
| 6 | 64-QAM | 3/4 | 6 | 108 | 6 | 1944 | 1458 | 1 | 36450.0 | 40500.0 |
| 7 | 64-QAM | 5/6 | 6 | 108 | 6 | 1944 | 1620 | 1 | 40500.0 | 45000.0 |
| 8 | 256-QAM | 3/4 | 8 | 108 | 6 | 2592 | 1944 | 1 | 48600.0 | 54000.0 |
| 9 | 256-QAM | 5/6 | 8 | 108 | 6 | 2592 | 2160 | 1 | 54000.0 | 60000.0 |

*FIG. 5C*

4 MHz, 4 Spatial Streams

| MCS Idx | Mod | R | N_bpscs | N_sd | N_sp | N_cbps | N_dbps | N_es | Data_rate (Kbps) 8us GI | Data_rate (Kbps) 4us GI |
|---|---|---|---|---|---|---|---|---|---|---|
| 0 | BPSK | 1/2 | 1 | 108 | 6 | 432 | 216 | 1 | 5400.0 | 6000.0 |
| 1 | QPSK | 1/2 | 2 | 108 | 6 | 864 | 432 | 1 | 10800.0 | 12000.0 |
| 2 | QPSK | 3/4 | 2 | 108 | 6 | 864 | 648 | 1 | 16200.0 | 18000.0 |
| 3 | 16-QAM | 1/2 | 4 | 108 | 6 | 1728 | 864 | 1 | 21600.0 | 24000.0 |
| 4 | 16-QAM | 3/4 | 4 | 108 | 6 | 1728 | 1296 | 1 | 32400.0 | 36000.0 |
| 5 | 64-QAM | 2/3 | 6 | 108 | 6 | 2592 | 1728 | 1 | 43200.0 | 48000.0 |
| 6 | 64-QAM | 3/4 | 6 | 108 | 6 | 2592 | 1944 | 1 | 48600.0 | 54000.0 |
| 7 | 64-QAM | 5/6 | 6 | 108 | 6 | 2592 | 2160 | 1 | 54000.0 | 60000.0 |
| 8 | 256-QAM | 3/4 | 8 | 108 | 6 | 3456 | 2592 | 2 | 64800.0 | 72000.0 |
| 9 | 256-QAM | 5/6 | 8 | 108 | 6 | 3456 | 2880 | 2 | 72000.0 | 80000.0 |

FIG. 5D

8 MHz, 1 Spatial Stream

| MCS Idx | Mod | R | N bpscs | N sd | N sp | N cbps | N dbps | N es | Data rate (Kbps) 8us GI | 4us GI |
|---|---|---|---|---|---|---|---|---|---|---|
| 0 | BPSK | 1/2 | 1 | 234 | 8 | 234 | 117 | 1 | 2925.0 | 3250.0 |
| 1 | QPSK | 1/2 | 2 | 234 | 8 | 468 | 234 | 1 | 5850.0 | 6500.0 |
| 2 | QPSK | 3/4 | 2 | 234 | 8 | 468 | 351 | 1 | 8775.0 | 9750.0 |
| 3 | 16-QAM | 1/2 | 4 | 234 | 8 | 936 | 468 | 1 | 11700.0 | 13000.0 |
| 4 | 16-QAM | 3/4 | 4 | 234 | 8 | 936 | 702 | 1 | 17550.0 | 19500.0 |
| 5 | 64-QAM | 2/3 | 6 | 234 | 8 | 1404 | 936 | 1 | 23400.0 | 26000.0 |
| 6 | 64-QAM | 3/4 | 6 | 234 | 8 | 1404 | 1053 | 1 | 26325.0 | 29250.0 |
| 7 | 64-QAM | 5/6 | 6 | 234 | 8 | 1404 | 1170 | 1 | 29250.0 | 32500.0 |
| 8 | 256-QAM | 3/4 | 8 | 234 | 8 | 1872 | 1404 | 1 | 35100.0 | 39000.0 |
| 9 | 256-QAM | 5/6 | 8 | 234 | 8 | 1872 | 1560 | 1 | 39000.0 | 43333.3 |

*FIG. 6A*

8 MHz, 2 Spatial Streams

| MCS Idx | Mod | R | N_bpscs | N_sd | N_sp | N_cbps | N_dbps | N_es | Data rate (Kbps) 8us GI | Data rate (Kbps) 4us GI |
|---|---|---|---|---|---|---|---|---|---|---|
| 0 | BPSK | 1/2 | 1 | 234 | 8 | 468 | 234 | 1 | 5850.0 | 6500.0 |
| 1 | QPSK | 1/2 | 2 | 234 | 8 | 936 | 468 | 1 | 11700.0 | 13000.0 |
| 2 | QPSK | 3/4 | 2 | 234 | 8 | 936 | 702 | 1 | 17550.0 | 19500.0 |
| 3 | 16-QAM | 1/2 | 4 | 234 | 8 | 1872 | 936 | 1 | 23400.0 | 26000.0 |
| 4 | 16-QAM | 3/4 | 4 | 234 | 8 | 1872 | 1404 | 1 | 35100.0 | 39000.0 |
| 5 | 64-QAM | 2/3 | 6 | 234 | 8 | 2808 | 1872 | 1 | 46800.0 | 52000.0 |
| 6 | 64-QAM | 3/4 | 6 | 234 | 8 | 2808 | 2106 | 1 | 52650.0 | 58500.0 |
| 7 | 64-QAM | 5/6 | 6 | 234 | 8 | 2808 | 2340 | 2 | 58500.0 | 65000.0 |
| 8 | 256-QAM | 3/4 | 8 | 234 | 8 | 3744 | 2808 | 2 | 70200.0 | 78000.0 |
| 9 | 256-QAM | 5/6 | 8 | 234 | 8 | 3744 | 3120 | 2 | 78000.0 | 86666.7 |

*FIG. 6B*

8 MHz, 3 Spatial Streams

| MCS Idx | Mod | R | N_bpscs | N_sd | N_sp | N_cbps | N_dbps | N_es | Data rate (Kbps) | |
|---|---|---|---|---|---|---|---|---|---|---|
| | | | | | | | | | 8us GI | 4us GI |
| 0 | BPSK | 1/2 | 1 | 234 | 8 | 702 | 351 | 1 | 8775.0 | 9750.0 |
| 1 | QPSK | 1/2 | 2 | 234 | 8 | 1404 | 702 | 1 | 17550.0 | 19500.0 |
| 2 | QPSK | 3/4 | 2 | 234 | 8 | 1404 | 1053 | 1 | 26325.0 | 29250.0 |
| 3 | 16-QAM | 1/2 | 4 | 234 | 8 | 2808 | 1404 | 1 | 35100.0 | 39000.0 |
| 4 | 16-QAM | 3/4 | 4 | 234 | 8 | 2808 | 2106 | 1 | 52650.0 | 58500.0 |
| 5 | 64-QAM | 2/3 | 6 | 234 | 8 | 4212 | 2808 | 2 | 70200.0 | 78000.0 |
| 6 | 64-QAM | 3/4 | 6 | 234 | 8 | 4212 | 3159 | 2 | 78975.0 | 87750.0 |
| 7 | 64-QAM | 5/6 | 6 | 234 | 8 | 4212 | 3510 | 2 | 87750.0 | 97500.0 |
| 8 | 256-QAM | 3/4 | 8 | 234 | 8 | 5616 | 4212 | 2 | 105300.0 | 117000.0 |
| 9 | 256-QAM | 5/6 | 8 | 234 | 8 | 5616 | 4680 | 3 | 117000.0 | 130000.0 |

FIG. 6C

8 MHz, 4 Spatial Streams

| MCS Idx | Mod | R | N_bpscs | N_sd | N_sp | N_cbps | N_dbps | N_es | Data rate (Kbps) | |
|---|---|---|---|---|---|---|---|---|---|---|
| | | | | | | | | | 8us GI | 4us GI |
| 0 | BPSK | 1/2 | 1 | 234 | 8 | 936 | 468 | 1 | 11700.0 | 13000.0 |
| 1 | QPSK | 1/2 | 2 | 234 | 8 | 1872 | 936 | 1 | 23400.0 | 26000.0 |
| 2 | QPSK | 3/4 | 2 | 234 | 8 | 1872 | 1404 | 1 | 35100.0 | 39000.0 |
| 3 | 16-QAM | 1/2 | 4 | 234 | 8 | 3744 | 1872 | 1 | 46800.0 | 52000.0 |
| 4 | 16-QAM | 3/4 | 4 | 234 | 8 | 3744 | 2808 | 2 | 70200.0 | 78000.0 |
| 5 | 64-QAM | 2/3 | 6 | 234 | 8 | 5616 | 3744 | 2 | 93600.0 | 104000.0 |
| 6 | 64-QAM | 3/4 | 6 | 234 | 8 | 5616 | 4212 | 2 | 105300.0 | 117000.0 |
| 7 | 64-QAM | 5/6 | 6 | 234 | 8 | 5616 | 4680 | 3 | 117000.0 | 130000.0 |
| 8 | 256-QAM | 3/4 | 8 | 234 | 8 | 7488 | 5616 | 3 | 140400.0 | 156000.0 |
| 9 | 256-QAM | 5/6 | 8 | 234 | 8 | 7488 | 6240 | 3 | 156000.0 | 173333.3 |

*FIG. 6D*

16 MHz, 1 Spatial Stream

| MCS Idx | Mod | R | N_bpscs | N_sd | N_sp | N_cbps | N_dbps | N_es | Data_rate (Kbps) 8us GI | Data_rate (Kbps) 4us GI |
|---|---|---|---|---|---|---|---|---|---|---|
| 0 | BPSK | 1/2 | 1 | 468 | 16 | 468 | 234 | 1 | 5850.0 | 6500.0 |
| 1 | QPSK | 1/2 | 2 | 468 | 16 | 936 | 468 | 1 | 11700.0 | 13000.0 |
| 2 | QPSK | 3/4 | 2 | 468 | 16 | 936 | 702 | 1 | 17550.0 | 19500.0 |
| 3 | 16-QAM | 1/2 | 4 | 468 | 16 | 1872 | 936 | 1 | 23400.0 | 26000.0 |
| 4 | 16-QAM | 3/4 | 4 | 468 | 16 | 1872 | 1404 | 1 | 35100.0 | 39000.0 |
| 5 | 64-QAM | 2/3 | 6 | 468 | 16 | 2808 | 1872 | 1 | 46800.0 | 52000.0 |
| 6 | 64-QAM | 3/4 | 6 | 468 | 16 | 2808 | 2106 | 1 | 52650.0 | 58500.0 |
| 7 | 64-QAM | 5/6 | 6 | 468 | 16 | 2808 | 2340 | 2 | 58500.0 | 65000.0 |
| 8 | 256-QAM | 3/4 | 8 | 468 | 16 | 3744 | 2808 | 2 | 70200.0 | 78000.0 |
| 9 | 256-QAM | 5/6 | 8 | 468 | 16 | 3744 | 3120 | 2 | 78000.0 | 86666.7 |

*FIG. 7A*

16 MHz, 2 Spatial Streams

| MCS Idx | Mod | R | N_bpscs | N_sd | N_sp | N_cbps | N_dbps | N_es | Data_rate (Kbps) 8us GI | Data_rate (Kbps) 4us GI |
|---|---|---|---|---|---|---|---|---|---|---|
| 0 | BPSK | 1/2 | 1 | 468 | 16 | 936 | 468 | 1 | 11700.0 | 13000.0 |
| 1 | QPSK | 1/2 | 2 | 468 | 16 | 1872 | 936 | 1 | 23400.0 | 26000.0 |
| 2 | QPSK | 3/4 | 2 | 468 | 16 | 1872 | 1404 | 1 | 35100.0 | 39000.0 |
| 3 | 16-QAM | 1/2 | 4 | 468 | 16 | 3744 | 1872 | 1 | 46800.0 | 52000.0 |
| 4 | 16-QAM | 3/4 | 4 | 468 | 16 | 3744 | 2808 | 2 | 70200.0 | 78000.0 |
| 5 | 64-QAM | 2/3 | 6 | 468 | 16 | 5616 | 3744 | 2 | 93600.0 | 104000.0 |
| 6 | 64-QAM | 3/4 | 6 | 468 | 16 | 5616 | 4212 | 2 | 105300.0 | 117000.0 |
| 7 | 64-QAM | 5/6 | 6 | 468 | 16 | 5616 | 4680 | 3 | 117000.0 | 130000.0 |
| 8 | 256-QAM | 3/4 | 8 | 468 | 16 | 7488 | 5616 | 3 | 140400.0 | 156000.0 |
| 9 | 256-QAM | 5/6 | 8 | 468 | 16 | 7488 | 6240 | 3 | 156000.0 | 173333.3 |

FIG. 7B

16 MHz, 3 Spatial Streams – Option 1

| MCS Idx | Mod | R | N_bpscs | N_sd | N_sp | N_cbps | N_dbps | N_es | Data_rate (Kbps) 8us GI | 4us GI |
|---|---|---|---|---|---|---|---|---|---|---|
| 0 | BPSK | 1/2 | 1 | 468 | 16 | 1404 | 702 | 1 | 17550.0 | 19500.0 |
| 1 | QPSK | 1/2 | 2 | 468 | 16 | 2808 | 1404 | 1 | 35100.0 | 39000.0 |
| 2 | QPSK | 3/4 | 2 | 468 | 16 | 2808 | 2106 | 1 | 52650.0 | 58500.0 |
| 3 | 16-QAM | 1/2 | 4 | 468 | 16 | 5616 | 2808 | 2 | 70200.0 | 78000.0 |
| 4 | 16-QAM | 3/4 | 4 | 468 | 16 | 5616 | 4212 | 2 | 105300.0 | 117000.0 |
| 5 | 64-QAM | 2/3 | 6 | 468 | 16 | 8424 | 5616 | 3 | 140400.0 | 156000.0 |
| 6 | 64-QAM | 3/4 | 6 | 468 | 16 | 8424 | 6318 | 3 | 157950.0 | 175500.0 |
| 7 | 64-QAM | 5/6 | 6 | 468 | 16 | 8424 | 7020 | 4 | 175500.0 | 195000.0 |
| 8 | 256-QAM | 3/4 | 8 | 468 | 16 | 11232 | 8424 | 4 | 210600.0 | 234000.0 |
| 9 | 256-QAM | 5/6 | 8 | 468 | 16 | 11232 | 9360 | 5 | 234000.0 | 260000.0 |

FIG. 7C

16 MHz, 3 Spatial Streams – Option 2

| MCS Idx | Mod | R | N_bpscs | N_sd | N_sp | N_cbps | N_dbps | N_es | Data rate (Kbps) | |
|---|---|---|---|---|---|---|---|---|---|---|
| | | | | | | | | | 8us GI | 4us GI |
| 0 | BPSK | 1/2 | 1 | 468 | 16 | 1404 | 702 | 1 | 17550.0 | 19500.0 |
| 1 | QPSK | 1/2 | 2 | 468 | 16 | 2808 | 1404 | 1 | 35100.0 | 39000.0 |
| 2 | QPSK | 3/4 | 2 | 468 | 16 | 2808 | 2106 | 1 | 52650.0 | 58500.0 |
| 3 | 16-QAM | 1/2 | 4 | 468 | 16 | 5616 | 2808 | 2 | 70200.0 | 78000.0 |
| 4 | 16-QAM | 3/4 | 4 | 468 | 16 | 5616 | 4212 | 2 | 105300.0 | 117000.0 |
| 5 | 64-QAM | 2/3 | 6 | 468 | 16 | 8424 | 5616 | 3 | 140400.0 | 156000.0 |
| 6 | 64-QAM | 3/4 | 6 | 468 | 16 | 8424 | 6318 | 3 | 157950.0 | 175500.0 |
| 7 | 64-QAM | 5/6 | 6 | 468 | 16 | 8424 | 7020 | 4 | 175500.0 | 195000.0 |
| 8 | 256-QAM | 3/4 | 8 | 468 | 16 | 11232 | 8424 | 4 | 210600.0 | 234000.0 |
| 9 | 256-QAM | 5/6 | 8 | 468 | 16 | 11232 | 9360 | 6 | 234000.0 | 260000.0 |

FIG. 7D

16 MHz, 4 Spatial Streams – Option 1

| MCS Idx | Mod | R | N_bpscs | N_sd | N_sp | N_cbps | N_dbps | N_es | Data rate (Kbps) 8us GI | Data rate (Kbps) 4us GI |
|---|---|---|---|---|---|---|---|---|---|---|
| 0 | BPSK | 1/2 | 1 | 468 | 16 | 1872 | 936 | 1 | 23400.0 | 26000.0 |
| 1 | QPSK | 1/2 | 2 | 468 | 16 | 3744 | 1872 | 1 | 46800.0 | 52000.0 |
| 2 | QPSK | 3/4 | 2 | 468 | 16 | 3744 | 2808 | 2 | 70200.0 | 78000.0 |
| 3 | 16-QAM | 1/2 | 4 | 468 | 16 | 7488 | 3744 | 2 | 93600.0 | 104000.0 |
| 4 | 16-QAM | 3/4 | 4 | 468 | 16 | 7488 | 5616 | 3 | 140400.0 | 156000.0 |
| 5 | 64-QAM | 2/3 | 6 | 468 | 16 | 11232 | 7488 | 4 | 187200.0 | 208000.0 |
| 6 | 64-QAM | 3/4 | 6 | 468 | 16 | 11232 | 8424 | 4 | 210600.0 | 234000.0 |
| 7 | 64-QAM | 5/6 | 6 | 468 | 16 | 11232 | 9360 | 5 | 234000.0 | 260000.0 |
| 8 | 256-QAM | 3/4 | 8 | 468 | 16 | 14976 | 11232 | 6 | 280800.0 | 312000.0 |
| 9 | 256-QAM | 5/6 | 8 | 468 | 16 | 14976 | 12480 | 6 | 312000.0 | 346666.7 |

FIG. 8A

16 MHz, 4 Spatial Streams – Option 2

| MCS Idx | Mod | R | N bpscs | N sd | N sp | N cbps | N dbps | N_es | Data rate (Kbps) | |
|---|---|---|---|---|---|---|---|---|---|---|
| | | | | | | | | | 8us GI | 4us GI |
| 0 | BPSK | 1/2 | 1 | 468 | 16 | 1872 | 936 | 1 | 23400.0 | 26000.0 |
| 1 | QPSK | 1/2 | 2 | 468 | 16 | 3744 | 1872 | 1 | 46800.0 | 52000.0 |
| 2 | QPSK | 3/4 | 2 | 468 | 16 | 3744 | 2808 | 2 | 70200.0 | 78000.0 |
| 3 | 16-QAM | 1/2 | 4 | 468 | 16 | 7488 | 3744 | 2 | 93600.0 | 104000.0 |
| 4 | 16-QAM | 3/4 | 4 | 468 | 16 | 7488 | 5616 | 3 | 140400.0 | 156000.0 |
| 5 | 64-QAM | 2/3 | 6 | 468 | 16 | 11232 | 7488 | 4 | 187200.0 | 208000.0 |
| 6 | 64-QAM | 3/4 | 6 | 468 | 16 | 11232 | 8424 | 4 | 210600.0 | 234000.0 |
| 7 | 64-QAM | 5/6 | 6 | 468 | 16 | 11232 | 9360 | 6 | 234000.0 | 260000.0 |
| 8 | 256-QAM | 3/4 | 8 | 468 | 16 | 14976 | 11232 | 6 | 280800.0 | 312000.0 |
| 9 | 256-QAM | 5/6 | 8 | 468 | 16 | 14976 | 12480 | 6 | 312000.0 | 346666.7 |

FIG. 8B

4 MHz, 4 Spatial Streams (Single Encoder)

| MCS Idx | Mod | R | N_bpscs | N_sd | N_sp | N_cbps | N_dbps | N_es | Data_rate (Kbps) 8us GI | 4us GI |
|---|---|---|---|---|---|---|---|---|---|---|
| 0 | BPSK | 1/2 | 1 | 108 | 6 | 432 | 216 | 1 | 5400.0 | 6000.0 |
| 1 | QPSK | 1/2 | 2 | 108 | 6 | 864 | 432 | 1 | 10800.0 | 12000.0 |
| 2 | QPSK | 3/4 | 2 | 108 | 6 | 864 | 648 | 1 | 16200.0 | 18000.0 |
| 3 | 16-QAM | 1/2 | 4 | 108 | 6 | 1728 | 864 | 1 | 21600.0 | 24000.0 |
| 4 | 16-QAM | 3/4 | 4 | 108 | 6 | 1728 | 1296 | 1 | 32400.0 | 36000.0 |
| 5 | 64-QAM | 2/3 | 6 | 108 | 6 | 2592 | 1728 | 1 | 43200.0 | 48000.0 |
| 6 | 64-QAM | 3/4 | 6 | 108 | 6 | 2592 | 1944 | 1 | 48600.0 | 54000.0 |
| 7 | 64-QAM | 5/6 | 6 | 108 | 6 | 2592 | 2160 | 1 | 54000.0 | 60000.0 |
| 8 | 256-QAM | 3/4 | 8 | 108 | 6 | 3456 | 2592 | 1 | 64800.0 | 72000.0 |
| 9 | 256-QAM | 5/6 | 8 | 108 | 6 | 3456 | 2880 | 1 | 72000.0 | 80000.0 |

*FIG. 9A*

8 MHz, 2 Spatial Streams (Single Encoder)

| MCS Idx | Mod | R | N_bpscs | N_sd | N_sp | N_cbps | N_dbps | N_es | Data rate (Kbps) 8us GI | Data rate (Kbps) 4us GI |
|---|---|---|---|---|---|---|---|---|---|---|
| 0 | BPSK | 1/2 | 1 | 234 | 8 | 468 | 234 | 1 | 5850.0 | 6500.0 |
| 1 | QPSK | 1/2 | 2 | 234 | 8 | 936 | 468 | 1 | 11700.0 | 13000.0 |
| 2 | QPSK | 3/4 | 2 | 234 | 8 | 936 | 702 | 1 | 17550.0 | 19500.0 |
| 3 | 16-QAM | 1/2 | 4 | 234 | 8 | 1872 | 936 | 1 | 23400.0 | 26000.0 |
| 4 | 16-QAM | 3/4 | 4 | 234 | 8 | 1872 | 1404 | 1 | 35100.0 | 39000.0 |
| 5 | 64-QAM | 2/3 | 6 | 234 | 8 | 2808 | 1872 | 1 | 46800.0 | 52000.0 |
| 6 | 64-QAM | 3/4 | 6 | 234 | 8 | 2808 | 2106 | 1 | 52650.0 | 58500.0 |
| 7 | 64-QAM | 5/6 | 6 | 234 | 8 | 2808 | 2340 | 1 | 58500.0 | 65000.0 |
| 8 | 256-QAM | 3/4 | 8 | 234 | 8 | 3744 | 2808 | 1 | 70200.0 | 78000.0 |
| 9 | 256-QAM | 5/6 | 8 | 234 | 8 | 3744 | 3120 | 1 | 78000.0 | 86666.7 |

FIG. 9B

8 MHz, 3 Spatial Streams (Single Encoder)

| MCS Idx | Mod | R | N_bpscs | N_sd | N_sp | N_cbps | N_dbps | N_es | Data_rate (Kbps) 8us GI | Data_rate (Kbps) 4us GI |
|---|---|---|---|---|---|---|---|---|---|---|
| 0 | BPSK | 1/2 | 1 | 234 | 8 | 702 | 351 | 1 | 8775.0 | 9750.0 |
| 1 | QPSK | 1/2 | 2 | 234 | 8 | 1404 | 702 | 1 | 17550.0 | 19500.0 |
| 2 | QPSK | 3/4 | 2 | 234 | 8 | 1404 | 1053 | 1 | 26325.0 | 29250.0 |
| 3 | 16-QAM | 1/2 | 4 | 234 | 8 | 2808 | 1404 | 1 | 35100.0 | 39000.0 |
| 4 | 16-QAM | 3/4 | 4 | 234 | 8 | 2808 | 2106 | 1 | 52650.0 | 58500.0 |
| 5 | 64-QAM | 2/3 | 6 | 234 | 8 | 4212 | 2808 | 1 | 70200.0 | 78000.0 |
| 6 | 64-QAM | 3/4 | 6 | 234 | 8 | 4212 | 3159 | 1 | 78975.0 | 87750.0 |
| 7 | 64-QAM | 5/6 | 6 | 234 | 8 | 4212 | 3510 | 1 | 87750.0 | 97500.0 |
| 8 | 256-QAM | 3/4 | 8 | 234 | 8 | 5616 | 4212 | 1 | 105300.0 | 117000.0 |
| 9 | 256-QAM | 5/6 | 8 | 234 | 8 | 5616 | 4680 | 1 | 117000.0 | 130000.0 |

*FIG. 9C*

8 MHz, 4 Spatial Streams (Single Encoder)

| MCS Idx | Mod | R | N_bpscs | N_sd | N_sp | N_cbps | N_dbps | N_es | Data_rate (Kbps) 8us GI | Data_rate (Kbps) 4us GI |
|---|---|---|---|---|---|---|---|---|---|---|
| 0 | BPSK | 1/2 | 1 | 234 | 8 | 936 | 468 | 1 | 11700.0 | 13000.0 |
| 1 | QPSK | 1/2 | 2 | 234 | 8 | 1872 | 936 | 1 | 23400.0 | 26000.0 |
| 2 | QPSK | 3/4 | 2 | 234 | 8 | 1872 | 1404 | 1 | 35100.0 | 39000.0 |
| 3 | 16-QAM | 1/2 | 4 | 234 | 8 | 3744 | 1872 | 1 | 46800.0 | 52000.0 |
| 4 | 16-QAM | 3/4 | 4 | 234 | 8 | 3744 | 2808 | 1 | 70200.0 | 78000.0 |
| 5 | 64-QAM | 2/3 | 6 | 234 | 8 | 5616 | 3744 | 1 | 93600.0 | 104000.0 |
| 6 | 64-QAM | 3/4 | 6 | 234 | 8 | 5616 | 4212 | 1 | 105300.0 | 117000.0 |
| 7 | 64-QAM | 5/6 | 6 | 234 | 8 | 5616 | 4680 | 1 | 117000.0 | 130000.0 |
| 8 | 256-QAM | 3/4 | 8 | 234 | 8 | 7488 | 5616 | 1 | 140400.0 | 156000.0 |
| 9 | 256-QAM | 5/6 | 8 | 234 | 8 | 7488 | 6240 | 1 | 156000.0 | 173333.3 |

FIG. 9D

16 MHz, 1 Spatial Stream (Single Encoder)

| MCS Idx | Mod | R | N_bpscs | N_sd | N_sp | N_cbps | N_dbps | N_es | Data_rate (Kbps) | |
|---|---|---|---|---|---|---|---|---|---|---|
| | | | | | | | | | 8us GI | 4us GI |
| 0 | BPSK | 1/2 | 1 | 468 | 16 | 468 | 234 | 1 | 5850.0 | 6500.0 |
| 1 | QPSK | 1/2 | 2 | 468 | 16 | 936 | 468 | 1 | 11700.0 | 13000.0 |
| 2 | QPSK | 3/4 | 2 | 468 | 16 | 936 | 702 | 1 | 17550.0 | 19500.0 |
| 3 | 16-QAM | 1/2 | 4 | 468 | 16 | 1872 | 936 | 1 | 23400.0 | 26000.0 |
| 4 | 16-QAM | 3/4 | 4 | 468 | 16 | 1872 | 1404 | 1 | 35100.0 | 39000.0 |
| 5 | 64-QAM | 2/3 | 6 | 468 | 16 | 2808 | 1872 | 1 | 46800.0 | 52000.0 |
| 6 | 64-QAM | 3/4 | 6 | 468 | 16 | 2808 | 2106 | 1 | 52650.0 | 58500.0 |
| 7 | 64-QAM | 5/6 | 6 | 468 | 16 | 2808 | 2340 | 1 | 58500.0 | 65000.0 |
| 8 | 256-QAM | 3/4 | 8 | 468 | 16 | 3744 | 2808 | 1 | 70200.0 | 78000.0 |
| 9 | 256-QAM | 5/6 | 8 | 468 | 16 | 3744 | 3120 | 1 | 78000.0 | 86666.7 |

*FIG. 10A*

16 MHz, 2 Spatial Streams (Single Encoder)

| MCS Idx | Mod | R | N_bpscs | N_sd | N_sp | N_cbps | N_dbps | N_es | Data_rate (Kbps) 8us GI | Data_rate (Kbps) 4us GI |
|---|---|---|---|---|---|---|---|---|---|---|
| 0 | BPSK | 1/2 | 1 | 468 | 16 | 936 | 468 | 1 | 11700.0 | 13000.0 |
| 1 | QPSK | 1/2 | 2 | 468 | 16 | 1872 | 936 | 1 | 23400.0 | 26000.0 |
| 2 | QPSK | 3/4 | 2 | 468 | 16 | 1872 | 1404 | 1 | 35100.0 | 39000.0 |
| 3 | 16-QAM | 1/2 | 4 | 468 | 16 | 3744 | 1872 | 1 | 46800.0 | 52000.0 |
| 4 | 16-QAM | 3/4 | 4 | 468 | 16 | 3744 | 2808 | 1 | 70200.0 | 78000.0 |
| 5 | 64-QAM | 2/3 | 6 | 468 | 16 | 5616 | 3744 | 1 | 93600.0 | 104000.0 |
| 6 | 64-QAM | 3/4 | 6 | 468 | 16 | 5616 | 4212 | 1 | 105300.0 | 117000.0 |
| 7 | 64-QAM | 5/6 | 6 | 468 | 16 | 5616 | 4680 | 1 | 117000.0 | 130000.0 |
| 8 | 256-QAM | 3/4 | 8 | 468 | 16 | 7488 | 5616 | 1 | 140400.0 | 156000.0 |
| 9 | 256-QAM | 5/6 | 8 | 468 | 16 | 7488 | 6240 | 1 | 156000.0 | 173333.3 |

FIG. 10B

16 MHz, 3 Spatial Streams (Single Encoder)

| MCS Idx | Mod | R | N_bpscs | N_sd | N_sp | N_cbps | N_dbps | N_es | Data rate (Kbps) 8us GI | 4us GI |
|---|---|---|---|---|---|---|---|---|---|---|
| 0 | BPSK | 1/2 | 1 | 468 | 16 | 1404 | 702 | 1 | 17550.0 | 19500.0 |
| 1 | QPSK | 1/2 | 2 | 468 | 16 | 2808 | 1404 | 1 | 35100.0 | 39000.0 |
| 2 | QPSK | 3/4 | 2 | 468 | 16 | 2808 | 2106 | 1 | 52650.0 | 58500.0 |
| 3 | 16-QAM | 1/2 | 4 | 468 | 16 | 5616 | 2808 | 1 | 70200.0 | 78000.0 |
| 4 | 16-QAM | 3/4 | 4 | 468 | 16 | 5616 | 4212 | 1 | 105300.0 | 117000.0 |
| 5 | 64-QAM | 2/3 | 6 | 468 | 16 | 8424 | 5616 | 1 | 140400.0 | 156000.0 |
| 6 | 64-QAM | 3/4 | 6 | 468 | 16 | 8424 | 6318 | 1 | 157950.0 | 175500.0 |
| 7 | 64-QAM | 5/6 | 6 | 468 | 16 | 8424 | 7020 | 1 | 175500.0 | 195000.0 |
| 8 | 256-QAM | 3/4 | 8 | 468 | 16 | 11232 | 8424 | 1 | 210600.0 | 234000.0 |
| 9 | 256-QAM | 5/6 | 8 | 468 | 16 | 11232 | 9360 | 1 | 234000.0 | 260000.0 |

*FIG. 10C*

16 MHz, 4 Spatial Streams (Single Encoder)

| MCS Idx | Mod | R | N_bpscs | N_sd | N_sp | N_cbps | N_dbps | N_es | Data_rate (Kbps) 8us GI | 4us GI |
|---|---|---|---|---|---|---|---|---|---|---|
| 0 | BPSK | 1/2 | 1 | 468 | 16 | 1872 | 936 | 1 | 23400.0 | 26000.0 |
| 1 | QPSK | 1/2 | 2 | 468 | 16 | 3744 | 1872 | 1 | 46800.0 | 52000.0 |
| 2 | QPSK | 3/4 | 2 | 468 | 16 | 3744 | 2808 | 1 | 70200.0 | 78000.0 |
| 3 | 16-QAM | 1/2 | 4 | 468 | 16 | 7488 | 3744 | 1 | 93600.0 | 104000.0 |
| 4 | 16-QAM | 3/4 | 4 | 468 | 16 | 7488 | 5616 | 1 | 140400.0 | 156000.0 |
| 5 | 64-QAM | 2/3 | 6 | 468 | 16 | 11232 | 7488 | 1 | 187200.0 | 208000.0 |
| 6 | 64-QAM | 3/4 | 6 | 468 | 16 | 11232 | 8424 | 1 | 210600.0 | 234000.0 |
| 7 | 64-QAM | 5/6 | 6 | 468 | 16 | 11232 | 9360 | 1 | 234000.0 | 260000.0 |
| 8 | 256-QAM | 3/4 | 8 | 468 | 16 | 14976 | 11232 | 1 | 280800.0 | 312000.0 |
| 9 | 256-QAM | 5/6 | 8 | 468 | 16 | 14976 | 12480 | 1 | 312000.0 | 346666.7 |

FIG. 10D

| Parameter | 1 MHz | 2 MHz | 4 MHz | 8 MHz | 16 MHz | Description |
|---|---|---|---|---|---|---|
| N_sd | 24 | 52 | 108 | 234 | 468 | Number of complex data subcarriers |
| N_sp | 2 | 4 | 6 | 8 | 16 | Number of pilot subcarriers |
| N_st | 26 | 56 | 114 | 242 | 484 | Number of total subcarriers (excluding guards) |
| N_sr | 13 | 28 | 58 | 122 | 250 | Highest data subcarrier index |
| delta_f | 31.25KHz | | | | | Subcarrier frequency spacing |
| T_dft | 32us | | | | | IDFT/DFT period |
| T_gi | 8us = T_dft/4 | | | | | Guard interval duration |
| T_gi2 | 16us | | | | | Double guard interval duration |
| T_gis | 4us = T_dft/8 | | | | | Short guard interval duration |
| T_syml | 40us = T_dft + T_gi = 1.25 x T_dft | | | | | OFDM symbol duration w/ Long GI |
| T_syms | 36us = T_dft + T_gis = 1.125 x T_dft | | | | | OFDM symbol duration w/ Short GI |
| T_sym | T_syml or T_syms depending on the GI used | | | | | OFDM symbol duration |
| N_service | 16 | | | | | Number of bits in the SERVICE field |
| N_tail | 6 | | | | | Number of tails bits per BCC encoder |
| T_stf | 160us = 20 x T_dft/4 | | 80us = 10 x T_dft/4 | | | Duration of STF field for SU and MU formats |
| T_ltf1 | 160us = T_gi2 + 2 x T_dft + T_gi + T_dft + T_gi + T_dft | | 80us = T_gi2 + 2 x T_dft | | | Duration of LTF1 field for SU and MU formats |
| T_sig | 240us = 6 x T_syml or 200us = 5 x T_syml | | 80us = 2 x T_syml | | | Duration of SIG field for SU format, SIG-A for MU format |
| T_mimo_ltf | 40us = T_syml | | | | | Duration of each LTF symbol after the SIG for SU format [whenever Nsts>1] and duration of each LTF after SIG-A in the MU format |
| T_mu_stf | | | 40us = 5 x T_dft/4 | | | Duration of MU STF field for MU format |
| T_sig_b | | | 40us = T_syml | | | Duration of SIG-B field for MU format |

*FIG. 14*

| | Field | Tone Scaling Parameter as a function of bandwidth | | | | | | GI duration |
|---|---|---|---|---|---|---|---|---|
| | | 1 MHz | 2 MHz | 4 MHz | 8 MHz | 16 MHz | | |
| SU format | STF | 6 | | 12 | 24 | 48 | 96 | - |
| | LTF_1 | | 26 | 56 | 114 | 242 | 484 | 1MHz: T_gi2 for first 2 OFDM symbols, T_gi1 for last 2 OFDM symbols<br>>= 2MHz: T_gi2 |
| | SIG | | 26 | 52 | 104 | 208 | 416 | T_gi1 |
| | MIMO-LTF | | 26 | 56 | 114 | 242 | 484 | T_gi1 |
| | Data | | 26 | 56 | 114 | 242 | 484 | T_gi or T_gis (depending on Short GI bit indication in SIG) |
| MU format | STF | | | 12 | 24 | 48 | 96 | - |
| | LTF_1 | | | 56 | 114 | 242 | 484 | T_gi2 |
| | SIG-A | | | 52 | 104 | 208 | 416 | T_gi1 |
| | MU-STF | | | 12 | 24 | 48 | 96 | - |
| | MIMO-LTF | | | 56 | 114 | 242 | 484 | T_gi1 |
| | SIG-B | | | 56 | | | | for >= 2MHz |
| | Data | | | 56 | 114 | 242 | 484 | T_gi or T_gis (depending on Short GI bit indication in SIG-A) |

FIG. 16

FRAME FORMATS AND TIMING PARAMETERS IN SUB-1 GHZ NETWORKS

CROSS-REFERENCE TO RELATED APPLICATIONS

The present application claims priority from commonly owned U.S. Provisional Patent Application No. 61/619,338 filed Apr. 2, 2012, the content of which is expressly incorporated herein by reference in its entirety.

BACKGROUND

1. Field

The present disclosure relates to wireless data communications.

2. Background

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

In some communication systems, networks may be used to exchange messages among several interacting spatially-separated devices. Networks may be classified according to geographic scope, which could be, for example, a metropolitan area, a local area, or a personal area. Such networks may be designated respectively as a wide area network (WAN), a metropolitan area network (MAN), a local area network (LAN), a wireless local area network (WLAN), or a personal area network (PAN). Networks may also differ according to the switching/routing techniques used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks may be preferred when network elements are mobile and have dynamic connectivity needs or if the network architecture is formed in an ad hoc, rather than fixed, topology. Wireless networks may employ intangible physical media in an unguided propagation mode using electromagnetic waves in the radio, microwave, infra-red, optical, or other frequency bands. Wireless networks may advantageously facilitate user mobility and rapid field deployment when compared to fixed wired networks.

Devices in a wireless network may transmit/receive information with other devices/systems. The information may include packets. The packets may include overhead information (e.g., header information, packet properties, etc. related to routing the packets through the network) as well as data (e.g., user data, multimedia content, etc. in a payload of the packet).

SUMMARY

Wireless networking systems can operate at various frequency ranges and at various bandwidths. Institute of Electrical and Electronics Engineers (IEEE) 802.11 is a set of industry standards, protocols, and groups associated with wireless networking. For example, IEEE 802.11a, 802.11b, 802.11g, and 802.11n are wireless networking standards that may be used in customer premise wireless networking, such as in a home or office environment. "In progress" IEEE 802.11 standards include 802.11ac (entitled "Very High Throughput in <6 GHz"), 802.11ad (entitled "Very High Throughput in 60 GHz"), 802.11af (entitled "Wireless Local Area Network (LAN) in Television White Space"), and 802.11ah (entitled "Sub-1 GHz").

In particular, IEEE 802.11ah is associated with wireless communication at frequencies less than one gigahertz. Such communication may be useful for devices having low duty cycles, such as sensors. To illustrate, a wireless sensor that communicates over an IEEE 802.11ah network may wake up for a few seconds to perform a few measurements, communicate results of the measurements to a destination, and then sleep for a few minutes. An IEEE 802.11ah wireless network may support communication using 1, 2, 3, or 4 spatial streams at 1 MHz, 2 MHz, 4 MHz, 8 MHz, and 16 MHz bandwidths.

Systems and methods of controlling characteristics of messages in sub-1 GHz networks (e.g., IEEE 802.11ah networks) are disclosed. For example, prior to sending a message (e.g., a packet) from a transmitter to a receiver, the transmitter may choose a modulation and coding scheme (MCS) to apply to the message. More than one MCS may be available for each bandwidth/spatial stream combination. An index value corresponding to the chosen MCS may be included in the message. For example, an MCS index may be included in a signal (SIG) field of a physical layer (PHY) preamble of the message. When the message is received, the receiver may use the MCS index to determine various message characteristics that may be useful in decoding the message. In one implementation, the transmitter and the receiver may each store or otherwise have access to data structures (e.g., tables) that can be searched by MCS index.

Packets communicated via a sub-1 GHz wireless network may comply with one of multiple frame formats (e.g., a single user (SU) or "short" format and a multi user (MU) or "long" format) and may comply with various timing parameters. The frame format may identify what fields are included in the packet and the order of the fields in the packet. The timing parameters may indicate quantities and field durations associated with the packet. The frame format and/or timing parameters may be used in encoding and/or decoding of the packet. A data structure (e.g., table) indicating timing parameters for different frame formats may be stored at or otherwise accessible to transmitters and receivers.

Packets communicated via a sub-1 GHz wireless network may also be subjected to tone scaling. For example, different fields of a packet may be tone scaled by a different amount. Tone scaling parameters may be used in encoding and/or decoding of the packet. A data structure (e.g., table) indicating tone scaling parameters for different fields may be stored at or otherwise accessible to transmitters and receivers.

In a particular embodiment, a method includes selecting, at a transmitter, a frame format for use in communicating a packet via a sub-one gigahertz wireless network operating at a particular bandwidth, where the frame format is selected based at least in part on the particular bandwidth. The method also includes determining one or more timing parameters based on the selected frame format and the particular bandwidth. The method further includes generating the packet in accordance with the selected frame format and the one or more timing parameters. The method includes sending the packet from the transmitter to a receiver. The selected frame format is a short frame format when the particular bandwidth is one megahertz, and the selected frame format is the short frame format or a long frame format when the particular bandwidth is greater than one megahertz.

In another particular embodiment, a non-transitory processor-readable medium stores one or more data structures. The one or more data structures indicate timing parameters for a short frame format and a long frame format of a sub-one gigahertz wireless network for each of a plurality of operating bandwidths of the sub-one gigahertz wireless network. The timing parameters include a number of complex data subcarriers, a number of pilot subcarriers, a number of total subcarriers excluding guards, a highest data subcarrier index, a subcarrier frequency spacing, an inverse discrete Fourier transform period, a discrete Fourier transform period, a guard interval duration, a double guard interval duration, a short guard interval duration, or any combination thereof. Alternately, or in addition, the timing parameters include an orthogonal frequency-division multiplexing (OFDM) symbol duration with long guard intervals, an OFDM symbol duration with short guard intervals, an OFDM symbol duration, a number of bits in a SERVICE field, a number of tail bits per binary convolution code encoder, a short training field (STF) duration, a long training field (LTF) duration, a signal field (SIG) duration, a signal A field (SIG-A) duration, a multiple-input multiple-output LTF (MIMO-LTF) duration, a long format STF duration, a signal B field (SIG-B) duration, or any combination thereof.

In another particular embodiment, an apparatus includes a memory storing one or more data structures. The one or more data structures indicate timing parameters for each of a plurality of frame formats of a sub-one gigahertz wireless network and a plurality of bandwidths of a sub-one gigahertz wireless network. The apparatus also includes a processor coupled to the memory and configured to select a frame format for use in communicating a packet via the sub-one gigahertz wireless network operating at a particular bandwidth, where the frame format is selected based at least in part on the particular bandwidth. The processor is also configured to determine one or more timing parameters based on the selected frame format and the particular bandwidth. The processor is further configured to generate the packet in accordance with the selected frame format and the one or more timing parameters. The selected frame format is a short frame format when the particular bandwidth is one megahertz, and the selected frame format is the short frame format or a long frame format when the particular bandwidth is greater than one megahertz.

In another particular embodiment, an apparatus includes means for storing one or more data structures. The one or more data structures indicate timing parameters for a plurality of frame formats and a plurality of bandwidths of a sub-one gigahertz wireless network. The apparatus also includes means for selecting a frame format for use in communicating a packet via the sub-one gigahertz wireless network operating at a particular bandwidth, where the frame format is selected based at least in part on the particular bandwidth. The apparatus further includes means for determining the one or more timing parameters based on the selected frame format and the particular bandwidth. The apparatus includes means for generating the packet in accordance with the selected frame format and the one or more timing parameters.

One particular advantage provided by at least one of the disclosed embodiments is an ability to control various characteristics of messages (e.g., packets) communicated via a sub-1 GHz wireless network. For example, such characteristics may include MCS, frame format, timing parameters, tone scaling parameters, and/or other characteristics described herein.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIGS. 2A, 2B, and 2C illustrate particular examples of the MCS tables of FIG. 1;

FIGS. 3A, 3B, and 3C illustrate additional particular examples of the MCS tables of FIG. 1;

FIGS. 4A, 4B, 4C, and 4D illustrate additional particular examples of the MCS tables of FIG. 1;

FIGS. 5A, 5B, 5C, and 5D illustrate additional particular examples of the MCS tables of FIG. 1;

FIGS. 6A, 6B, 6C, and 6D illustrate additional particular examples of the MCS tables of FIG. 1;

FIGS. 7A, 7B, 7C, and 7D illustrate additional particular examples of the MCS tables of FIG. 1;

FIGS. 8A and 8B illustrate additional particular examples of the MCS tables of FIG. 1;

FIGS. 9A, 9B, 9C and 9D illustrate particular examples of the MCS tables of FIG. 1 when a single encoder is used for all possible bandwidths and numbers of spatial streams;

FIGS. 10A, 10B, 10C and 10D illustrate additional particular examples of the MCS tables of FIG. 1 when a single encoder is used for all possible bandwidths and numbers of spatial streams;

FIG. 14 illustrates particular examples of the timing parameters of FIG. 1;

FIG. 16 illustrates particular examples of the tone scaling parameters of FIG. 1;

DETAILED DESCRIPTION

Figure 1:
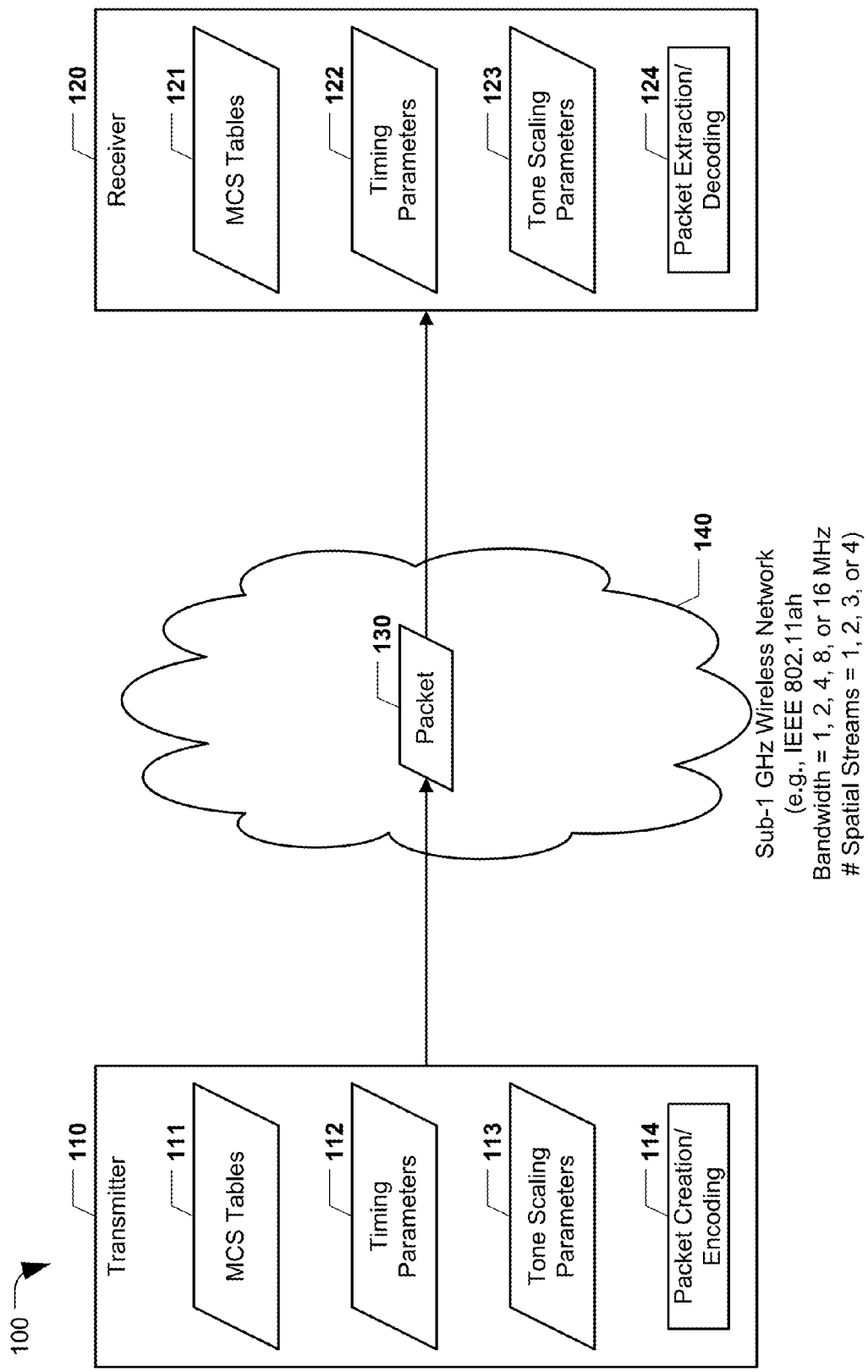
FIG. 1 is a diagram of a particular embodiment of a system operable to control message characteristics in a sub-1 GHz wireless network.

FIG. 1 is a diagram of a particular embodiment of a system 100 operable to control message characteristics in a sub-1 GHz wireless network 140. In a particular embodiment, the sub-1 GHz wireless network 140 operates in accordance with an IEEE 802.11ah protocol. The wireless network 140 may support multiple bandwidths and one or more spatial streams.

For example, the wireless network 140 may support 1 MHz, 2 MHz, 4 MHz, 8 MHz, and 16 MHz bandwidths and the use of 1, 2, 3, or 4 spatial streams.

The system 100 includes a transmitter 110 and a receiver 120. It should be noted that although a single transmitter and receiver are shown in FIG. 1, alternate embodiments may include more than one transmitter and or receiver. The transmitter 110 and the receiver 120 may communicate via packets, such as an illustrative packet 130. It should be noted that although a dedicated transmitter 110 and a dedicated receiver 120 are shown in FIG. 1, some devices (e.g., transceivers or mobile communication devices that include a transceiver) may be capable of both packet transmission as well as packet reception. Thus, the wireless network 140 supports two-way communication.

The transmitter 110 may store or otherwise have access to MCS tables 111, timing parameters 112, and tone scaling parameters 113. The transmitter 110 may include a packet creator/encoder 114 that is configured to create and encode packets, such as the packet 130. The creator/encoder 114 may set one or more characteristics of the packet 130 during the creation and encoding process.

For example, the creator/encoder 114 may select a particular modulation and coding scheme (MCS) of the packet 130 from a plurality of available MCSs. Which MCSs are available may depend on the bandwidth and the number of spatial streams in use at the wireless network 140. In a particular embodiment, devices connected to the wireless network 140 may be notified of the bandwidth and number of spatial streams by an access point associated with the wireless network (e.g., via a beacon, probe response, or other control message). Devices may also determine network characteristics, such as bandwidth and number of spatial streams, by examining messages communicated via the wireless network 140. Which particular MCS is selected may be based on factors such as channel conditions, distance, and desired data rate. The transmitter 110 may store or otherwise have access to one or more MCS tables 111 that identify the available MCSs for each combination of bandwidth and number of spatial streams. The creator/encoder 114 may insert an index of the selected MCS into the packet 130. In a particular embodiment, the MCS index may be included in a signal (SIG) field of a physical layer (PHY) preamble of the packet 130. The MCS index may indicate a modulation scheme and a coding rate of the packet 130 and may also indicate or be useable to derive additional encoding characteristics of the packet 130, such as a number of bits per subcarrier symbol, a number of data symbols, a number of pilot symbols, a number of coded bits per orthogonal frequency-division multiplexing (OFDM) symbol, a number of data bits per (OFDM) symbol, a number of encoders used to encode the packet 130, data rate(s), and/or a guard interval. Particular examples of MCS tables are described with reference to FIGS. 2-10.

The receiver 120 may store or otherwise have access to MCS tables 121, timing parameters 122, and tone scaling parameters 123, which may be the same as the MCS tables 111, the timing parameter 112, and the tone scaling parameters 113, respectively. The receiver 120 may include a packet extractor/decoder 124 that is configured to process received packets, such as the received packet 130. For example, the extractor/decoder 124 may extract the MCS index from the packet 130. The extractor/decoder 124 may identify a particular MCS table of the MCS tables 121 that corresponds to the bandwidth and number of spatial streams in use at the wireless network 140, and may search for characteristic values in the particular MCS table corresponding to the extracted MCS index. Based on the search, the extractor/decoder 124 may determine one or more encoding characteristics of the packet 130 and may decode the packet 130 based on the encoding characteristic(s).

The packet 130 may comply with one of multiple frame formats (e.g., a single user (SU) or "short" format and a multi user (MU) or "long" format) and may comply with various timing parameters. In a particular embodiment, the frame format is selected by the transmitter 110 or specified by the receiver 120. The frame format may identify fields to be included in the packet 130 and the order of the fields in the packet 130. The timing parameters may indicate quantities and field durations associated with the packet 130. Thus, the frame format and/or timing parameters may be used in encoding and/or decoding of the packet 130. A data structure (e.g., table) indicating timing parameters for different frame formats may be stored at or otherwise accessible to transmitters and receivers. For example, the timing parameters may be stored in a table or array in a memory at the transmitter 110 as the timing parameters 112 and at the receiver 120 as the timing parameters 122.

In a particular embodiment, the frame format used for the packet 130 is based at least in part on whether the underlying sub-1 GHz wireless network 140 is operating at 1 MHz bandwidth. For example, only the SU frame format may be available when the bandwidth is 1 MHz, but both the SU frame format and the MU frame format may be available for bandwidths greater than 1 MHz. In a particular embodiment, certain field durations may be longer when the bandwidth is 1 MHz than when the bandwidth is greater than 1 MHz. Examples of frame formats and timing parameters are further described with reference to FIGS. 13-14.

The packet 130 may also be subjected to tone scaling. For example, different fields of the packet 130 may be tone scaled by a different amount. Tone scaling parameters may be used in encoding and/or decoding of the packet. A data structure (e.g., table) indicating tone scaling parameters for different fields may be stored at or otherwise accessible to transmitters and receivers. For example, the tone scaling parameters may be stored in a table or array in a memory at the transmitter 110 as the tone scaling parameters 113 and at the receiver 120 as tone scaling parameters 123. In a particular embodiment, different tone scaling parameters may be used based on whether the packet 130 is represented in the SU frame format or in the MU frame format. Examples of tone scaling parameters are further described with reference to FIG. 16.

During operation, the transmitter 110 may create and encode the packet 130 based on a selected MCS index and encoding characteristics associated therewith, a selected frame format, selected timing parameters, and/or selected tone scaling parameters. The bandwidth and number of spatial streams in use at the underlying sub-1 GHz wireless network 140 may also impact the creation and encoding of the packet 130. For example, the bandwidth and number of spatial streams may affect what MCS indexes are available, what frame formats are available, and the values, or permitted range of values, of certain timing and tone scaling parameters. Upon receiving the packet 130, the receiver 120 may use the MCS index, the frame format, the timing parameters, and/or the selected tone scaling parameters in processing (e.g., decoding) the packet 130.

The system 100 of FIG. 1 may thus provide standardized values of MCS indexes, frame formats, timing parameters, tone scaling parameters, and other message characteristics for use in a sub-1 GHz wireless network (e.g., an IEEE 802.11ah wireless network), where such values vary based on characteristics (e.g., bandwidth and number of spatial streams) of the wireless network. Standardizing such PHY (e.g., Layer-1) and media access control (MAC) (e.g., Layer-2) messaging characteristics may enable reliable communication via the sub-1 GHz wireless network.

FIGS. 2A-2C illustrate examples of the MCS tables 111 and the MCS tables 121 of FIG. 1. In particular, FIGS. 2A-2C illustrate MCS tables for a sub-1 GHz wireless network operating at 1 MHz bandwidth while using 1 spatial stream.

MCS tables may include message characteristics for each of a plurality of MCS indexes. For example, the MCS tables may indicate a modulation scheme ("Mod"), a coding rate ("R"), a number of bits per subcarrier symbol ("N_bpscs"), a number of data symbols ("N_sd"), and/or a number of pilot symbols ("N_sp") for each MCS index ("MCS Idx"). The MCS tables may also indicate a number of coded bits per OFDM symbol ("N_cbps"), a number of data bits per OFDM symbol ("N_dbps"), a number of encoders used ("N_es"), data rate(s), and/or a guard interval ("GI"). Data rates may vary depending on whether an eight microsecond guard interval or a four microsecond guard interval is used.

In some embodiments, characteristics that are derivable from other characteristics may be omitted from the MCS tables. To illustrate, the number of coded bits per OFDM symbol may be derivable in accordance with the formula N_cbps=N_sd*N_bpscs. The number of data bits per OFDM symbol may be derivable in accordance with the formula N_dbps=N_cbps*R. In a particular embodiment, the number of encoders may be determined based on the formula N_es=ceiling(Data Rate/60 Mbps), where ceiling( ) is the integer ceiling function. In some situations, the formula for N_es may be modified, as further described herein.

In a particular embodiment, an MCS index for a given bandwidth and number of spatial streams may be unavailable if N_cbps/N_es is a non-integer, N_dbps/N_es is a non-integer, or if N_dbps is a non-integer. Such MCS indexes may be made unavailable for implementation simplicity (e.g., so that puncture patterns are consistent between OFDM symbols and so that extra padding symbols are not needed after puncturing/rate-matching). In a particular embodiment, to enable use of some MCS indexes that would otherwise be unavailable, the number of encoders N_es may be modified so that N_cbps/N_es and/or N_dbps/N_es become integers, as further described herein.

As described above, each packet communicated via a sub-1 GHz network may include an MCS index. The MCS index may be used to determine various characteristics of the packet. Generally, when an MCS is selected, the MCS may be applied to the outgoing packet once. However, in a particular embodiment when 1 MHz bandwidth and 1 spatial stream are used, one of the available MCS indexes may correspond to a scenario in which an MCS corresponding to Mod=BPSK (binary phase-shift keying) and R=¼ is applied twice. As shown in FIG. 2, there may be at least three different options for the MCS table corresponding to 1 MHz and 1 spatial stream. According to a first option (designated "Option 1" in FIG. 2A), the repeat MCS scenario may have an MCS index of 0. According to a second option (designated "Option 2" in FIG. 2B), the repeat MCS scenario may have an MCS index of 10. According to a third option (designated "Option 3" in FIG. 2C), the repeat MCS scenario may have an MCS index of 15 (i.e., −1 when a 4-bit MCS index is interpreted as two's complement).

FIGS. 3A-3C illustrate additional examples of the MCS tables 111 and the MCS tables 121 of FIG. 1. In particular, FIGS. 3A-3C illustrate MCS tables for a sub-1 GHz wireless network operating at 1 MHz bandwidth while using 2, 3, or 4 spatial streams.

FIGS. 4A-4D illustrate additional examples of the MCS tables 111 and the MCS tables 121 of FIG. 1. In particular, FIGS. 4A-4D illustrate MCS tables for a sub-1 GHz wireless network operating at 2 MHz bandwidth while using 1, 2, 3, or 4 spatial streams. As shown in FIGS. 4A, 4B, and 4D via shading, MCS index 9 may be unavailable when operating at 2 MHz using 1, 2, or 4 spatial streams, because N_dbps may be a non-integer. MCS indexes that are unavailable may be indicated as unavailable by being flagged (e.g., using an availability bit) or removed from an MCS table.

FIGS. 5A-5D illustrate additional examples of the MCS tables 111 and the MCS tables 121 of FIG. 1. In particular, FIGS. 5A-5D illustrate MCS tables for a sub-1 GHz wireless network operating at 4 MHz bandwidth while using 1, 2, 3, or 4 spatial streams.

FIGS. 6A-6D illustrate additional examples of the MCS tables 111 and the MCS tables 121 of FIG. 1. In particular, FIGS. 6A-6D illustrate MCS tables for a sub-1 GHz wireless network operating at 8 MHz bandwidth while using 1, 2, 3, or 4 spatial streams. As shown in FIG. 6C via shading, MCS index 6 may be unavailable when operating at 8 MHz using 3 spatial streams, because N_dbps/N_es may be a non-integer.

FIGS. 7A-7D illustrate additional examples of the MCS tables 111 and the MCS tables 121 of FIG. 1. In particular, FIGS. 7A-7D illustrate MCS tables for a sub-1 GHz wireless network operating at 16 MHz bandwidth while using 1, 2, or 3 spatial streams.

Two options are shown for the MCS table corresponding to 16 MHz and 3 spatial streams. In the first option of FIG. 7C, MCS index 9 is unavailable, because N_dbps/N_es is a non-integer. However, as shown in the second option of FIG. 7D, N_es may be increased from 5 to 6 for MCS index 9, which changes N_dbps/N_es to an integer quantity and makes MCS index 9 available. Thus, the number of encoders may be modified to make certain MCS indexes available. In devices that would otherwise not use six encoders, this modification may result in the addition of an encoder. However, in devices that use six encoders for other bandwidth/spatial stream combinations (e.g., devices that support 4 spatial streams at 16 MHz, as shown in FIG. 8), this modification may be performed without adding additional hardware.

FIGS. 8A-8B illustrate additional examples of the MCS tables 111 and the MCS tables 121 of FIG. 1. In particular, FIGS. 8A-8B illustrate MCS tables for a sub-1 GHz wireless network operating at 16 MHz bandwidth while using 4 spatial streams.

Two options are shown for the MCS table corresponding to 16 MHz, 4 spatial streams. In the first option of FIG. 8A, MCS index 7 is unavailable, because N_cbps/N_es is a non-integer. However, as shown in the second option of FIG. 8B, N_es may be increased from 5 to 6 for MCS index 7, which changes N_cbps/N_es to an integer quantity and makes MCS index 7 available.

In some embodiments, a single encoder may be used for all bandwidth/spatial stream combinations. As a result, N_dbps/N_es=N_dbps and N_cbps/N_es=N_cbps, and additional MCS indexes may become available. When a single encoder is used, the MCS tables for 1 MHz with 1-4 spatial streams, 2 MHz with 1-4 spatial streams, 4 MHz with 1-3 spatial streams, and 8 MHz with 1 spatial stream may be the same as described above, as each row in those tables has N_es=1. Conversely, MCS tables that include at least one row with N_es>1 may be modified, as shown in FIGS. 9-10.

FIGS. 9A-9D illustrate examples of the MCS tables 111 and the MCS tables 121 of FIG. 1 when a single encoder is used for all bandwidth/spatial stream combinations. In particular, FIGS. 9A-9D illustrate MCS tables for a sub-1 GHz wireless network operating at 4 MHz bandwidth while using 4 spatial streams and at 8 MHz bandwidth while using 2, 3, or 4 spatial streams, with a single encoder. Notably, MCS index 6 for 8 MHz and 3 spatial streams, which was shown as unavailable in FIG. 6C, is available in FIG. 9C because N_es=1.

FIGS. 10A-10D illustrate additional examples of the MCS tables 111 and the MCS tables 121 of FIG. 1 when a single encoder is used for all bandwidth/spatial stream combinations. In particular, FIGS. 10A-10D illustrate MCS tables for a sub-1 GHz wireless network operating at 16 MHz bandwidth while using 1, 2, 3, or 4 spatial streams with a single encoder. Notably, MCS index 9 for 16 MHz and 3 spatial streams, which was shown as unavailable in FIG. 7C unless N_es was increased from 5 to 6, is available in FIG. 10C because N_es=1.

Figure 11:
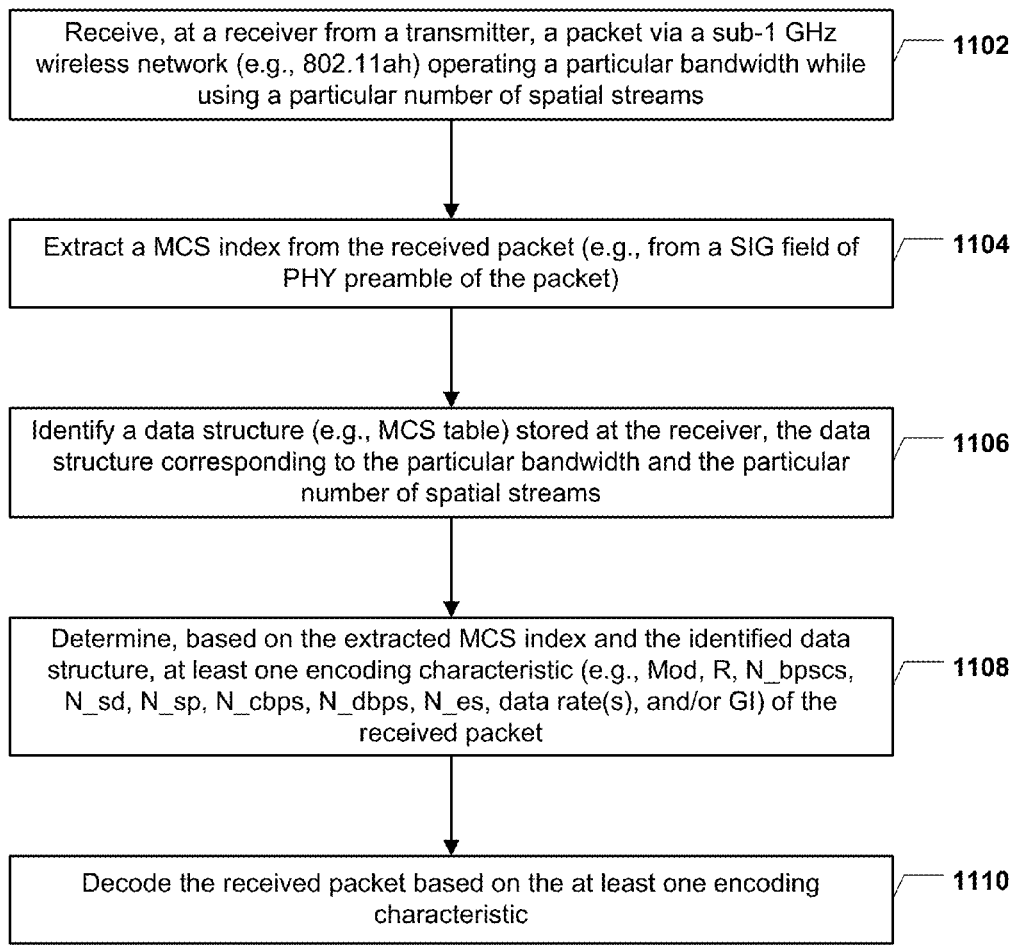
FIG. 11 is a flowchart of a particular embodiment of a method of determining message characteristics in a sub-1 GHz wireless network based on an MCS index.

FIG. 11 is a flowchart of a particular embodiment of a method 1100 of determining message characteristics based on an MCS index in a sub-1 GHz wireless network. In an illustrative embodiment, the method 1100 may be performed by the receiver 120 of FIG. 1.

The method 1100 may include receiving, at a receiver from a transmitter, a packet via a sub-1 GHz wireless network operating at a particular bandwidth while using a particular number of spatial streams, at 1102. The wireless network may be an IEEE 802.11ah network. For example, in FIG. 1, the receiver 120 may receive the packet 130 from the transmitter 110 via the wireless network 140.

The method 1100 may also include extracting an MCS index from the received packet, at 1104, and identifying a data structure stored at the receiver, at 1106. The data structure may correspond to the particular bandwidth and the particular number of spatial streams. In a particular embodiment, the MCS index may be extracted from a SIG field of a PHY preamble of the packet. For example, in FIG. 1, the extractor/decoder 124 may extract an MCS index from the packet 130 and may identify one of the MCS tables 121 that corresponds to the bandwidth and number of spatial streams. To illustrate, when the bandwidth is 4 MHz and 1 spatial stream is in use, the identified MCS table may be the table at the top of FIG. 5.

The method 1100 may further include determining, based on searching the identified data structure for characteristic values corresponding to the extracted MCS index, at least one encoding characteristic of the received packet, at 1108. The encoding characteristic may include a modulation scheme, a coding rate, a number of bits per subcarrier symbol, a number of data symbols, a number of pilot symbols, a number of coded bits per OFDM symbol, a number of data bits per OFDM symbol, a number of encoders, data rate(s), and/or a guard interval. To illustrate, when the extracted MCS index is 5, it may be determined from the table at the top of FIG. 5, that Mod=64-QAM, R=⅔, N_bpscs=6, N_sd=108, N_sp=6, N_cbps=648, N_dbps=432, N_es=1, and/or data rate=10,800 Kbps with 8 microsecond GIs and/or 12,000 Kbps with 4 microsecond GIs.

The method 1100 may include decoding the packet based on the at least one encoding characteristic. For example, in FIG. 1, the extractor/decoder 124 may decode the packet 130 based on the at least one encoding characteristic. To illustrate, the type of demodulation (e.g., binary phase-shift keying (BPSK), quadrature PSK (QPSK), quadrature amplitude modulation (QAM), etc.) applied to the packet 130 may be determined based on the "Mod" characteristic in the MCS table at the top of FIG. 5.

Figure 12:
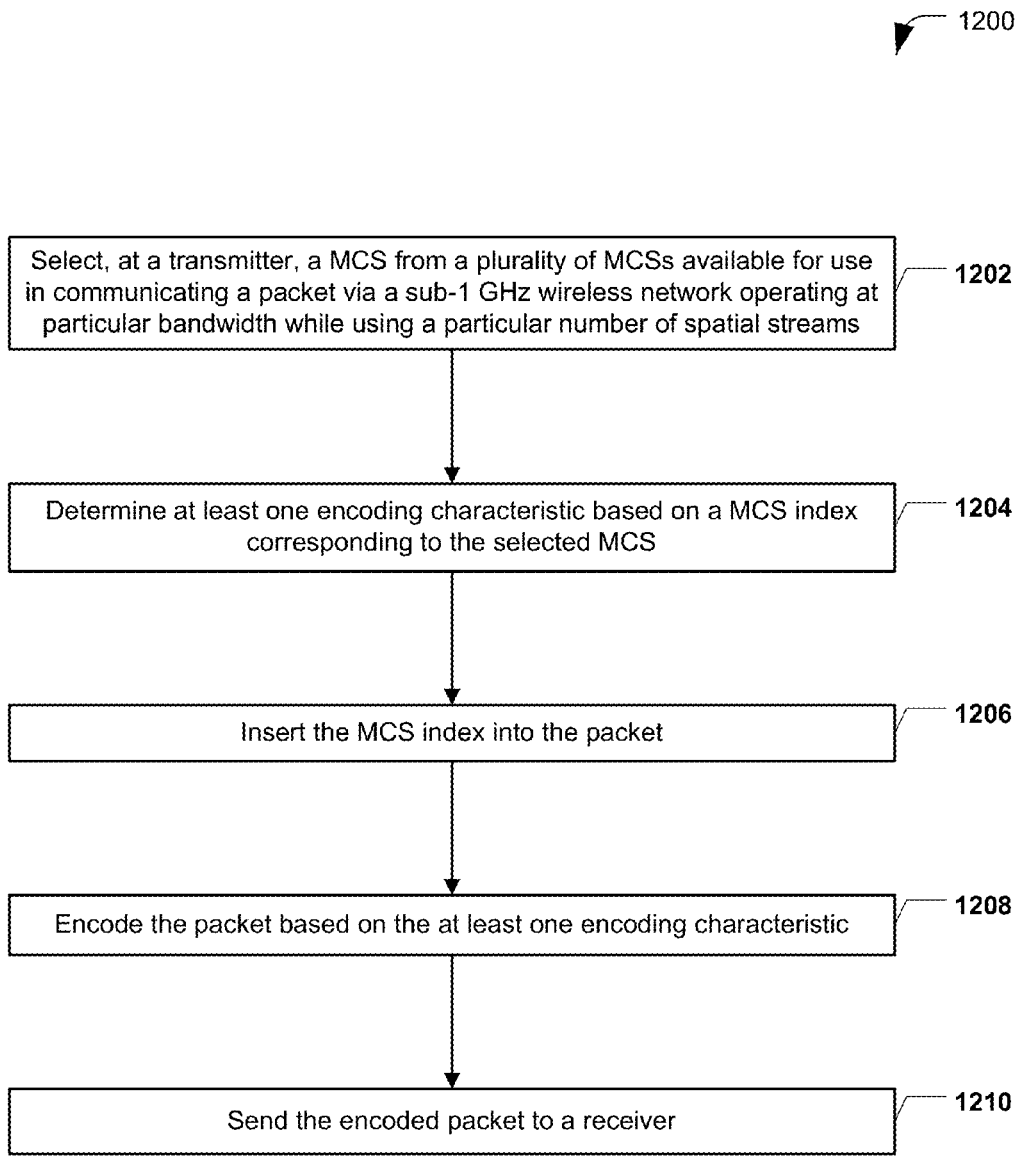
FIG. 12 is a flowchart of a particular embodiment of a method of controlling message characteristics in a sub-1 GHz wireless network based on an MCS index.

FIG. 12 is a flowchart of a particular embodiment of a method 1200 of controlling message characteristics of messages communicated via a sub-1 GHz wireless network based on an MCS index. In an illustrative embodiment, the method 1200 may be performed by the transmitter 110 of FIG. 1.

The method 1200 may include selecting, at a transmitter, an MCS from a plurality of MCSs available for use in communicating a packet via a sub-1 GHz wireless network operating at a particular bandwidth while using a particular number of spatial streams, at 1202. For example, in FIG. 1, the transmitter 110 may select an available MCS from one of the MCS tables 111 that corresponds to the bandwidth and number of spatial streams in use.

The method 1200 may also include determining at least one encoding characteristic based on an MCS index corresponding to the selected MCS, at 1204. The method 1200 may further include inserting the MCS index into the packet, at 1206, and encoding the packet based on the at least one encoding characteristic, at 1208. For example, in FIG. 1, the creator/encoder 114 may insert the MCS index into the packet 130 and encode the packet 130. The method 1200 may include sending the encoded packet to a receiver, at 1210. For example, in FIG. 1, the transmitter 110 may send the packet 130 to the receiver 120.

Figure 13:
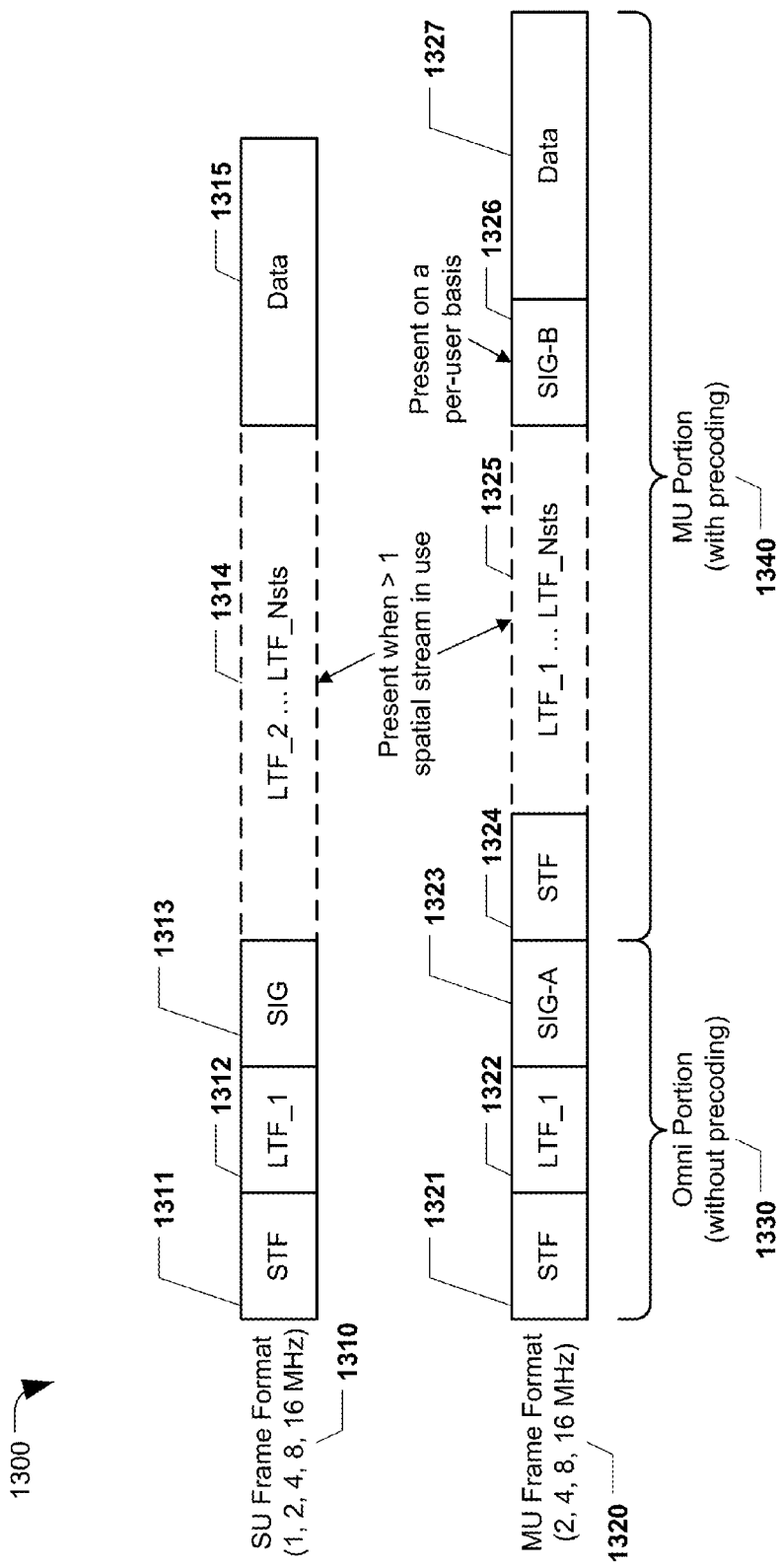
FIG. 13 is a diagram to illustrate particular embodiments of frame formats that may be used to with respect to the packet of FIG. 1.

FIG. 13 is a diagram to illustrate particular embodiments of frame formats that may be used to represent the packet 130 of FIG. 1 and is generally designated 1300. In a particular embodiment, packets transmitted via a sub-1 GHz network may comply with one of multiple frame formats, such as a single user (SU) frame format 1310 or a multi user (MU) frame format 1320. Each frame format 1310, 1320 may specify fields that are to be included in a packet and the order of such fields.

The SU frame format 1310 may include a short training field (STF) 1311, a long training field (LTF) 1312 (LTF_1), and a SIG field 1313. When multiple spatial streams are in use, the SU frame format 1310 may also include additional LTFs 1314 (e.g., one additional LTF for each additional spatial stream). The STF 1311, the LTF 1312, the SIG field 1313, and the additional LTFs 1314 may represent a packet preamble. The SU frame format 1310 may also include a data portion 1315.

The MU frame format 1320 may include two portions: a first portion without precoding (designated as an omni portion 1330) and a second portion with precoding (designated as an MU portion 1340). The omni portion 1330 may include a STF 1321, a first LTF 1322 (LTF_1), and a signal A (SIG-A) field 1323. The MU 1340 portion may include an additional STF 1324 and, when more than one spatial stream is in use, one or more additional LTFs 1325. The MU portion 1340 may also include a signal B (SIG-B) field 1326 and a data portion 1327. In a particular embodiment, the SIG-B field 1326 may be present on a per-user basis. The STF and LTF_1 fields may be present in both the non-precoded omni portion 1330 and the precoded MU portion 1340 to assist a receiver following an apparent channel conditions change between receipt and processing of the portions 1330 and 1340.

In a particular embodiment, the frame format selected by a transmitter may depend on the wireless network bandwidth in use. For example, only the SU frame format 1310 may be available when the bandwidth is 1 MHz, but both the SU frame format 1310 and the MU frame format 1320 may be available when the bandwidth is greater than 1 MHz (e.g., 2 MHz, 4 MHz, 8 MHz, or 16 MHz).

In a particular embodiment, timing parameters associated with the SU frame format 1310 and the MU frame format 1320 may be stored at or otherwise accessible to a transmitter and/or a receiver. FIG. 14 illustrates particular examples of timing parameters 1400 for the SU frame format 1310 and the MU frame format 1320. In an illustrative embodiment, the timing parameters 1400 may be the timing parameters 112 and/or the timing parameters 122 of FIG. 1.

In a particular embodiment, one or more of the timing parameters 1400 of a packet (e.g., the packet 130 of FIG. 1) may vary depending on the bandwidth (e.g., 1 MHz, 2 MHz, 4 MHz, 8 MHz, or 16 MHz) and/or number of spatial streams (1, 2, 3, or 4) in use. The timing parameters 1400 may include a number of complex data subcarriers N_sd, a number of pilot subcarriers N_sp, a number of total subcarriers (excluding guards) N_st, a highest subcarrier index N_sr, a subcarrier frequency spacing delta_f, an inverse discrete Fourier transform (IDFT) and DFT period T_dft, a guard interval duration T_gi, a double guard interval duration T_gi2, a short guard interval duration T_gis, an OFDM symbol duration with long intervals T_syml, an OFDM symbol duration with short guard intervals T_syms, a number of SERVICE field bits N_service, and/or a number of tail bits per binary convolution code (BCC) encoder N_tail.

The timing parameters 1400 may include a STF duration for SU and MU frame formats T_stf, a LTF_1 duration for SU and MU formats T_ltf1, a SIG field and SIG-A field duration T_sig, a second LTF duration for additional LTFs T_mimo_ltf, a second STF duration for MU frame format T_mu_stf, and/or a SIG-B field duration T_sig_b. Some timing parameters 1400 may have different values depending on the bandwidth in use. For example, the STF duration T_stf, the LTF1 duration T_ltf1, and the SIG/SIG-A field duration T_sig may each be longer when the bandwidth is 1 MHz than when the bandwidth is greater than 1 MHz. In a particular embodiment, one or more of the timing parameters may be interrelated, as shown in FIG. 14. Thus, timing parameters that are derivable from other timing parameters may be omitted from a table storing the timing parameters 1400.

Figure 15:
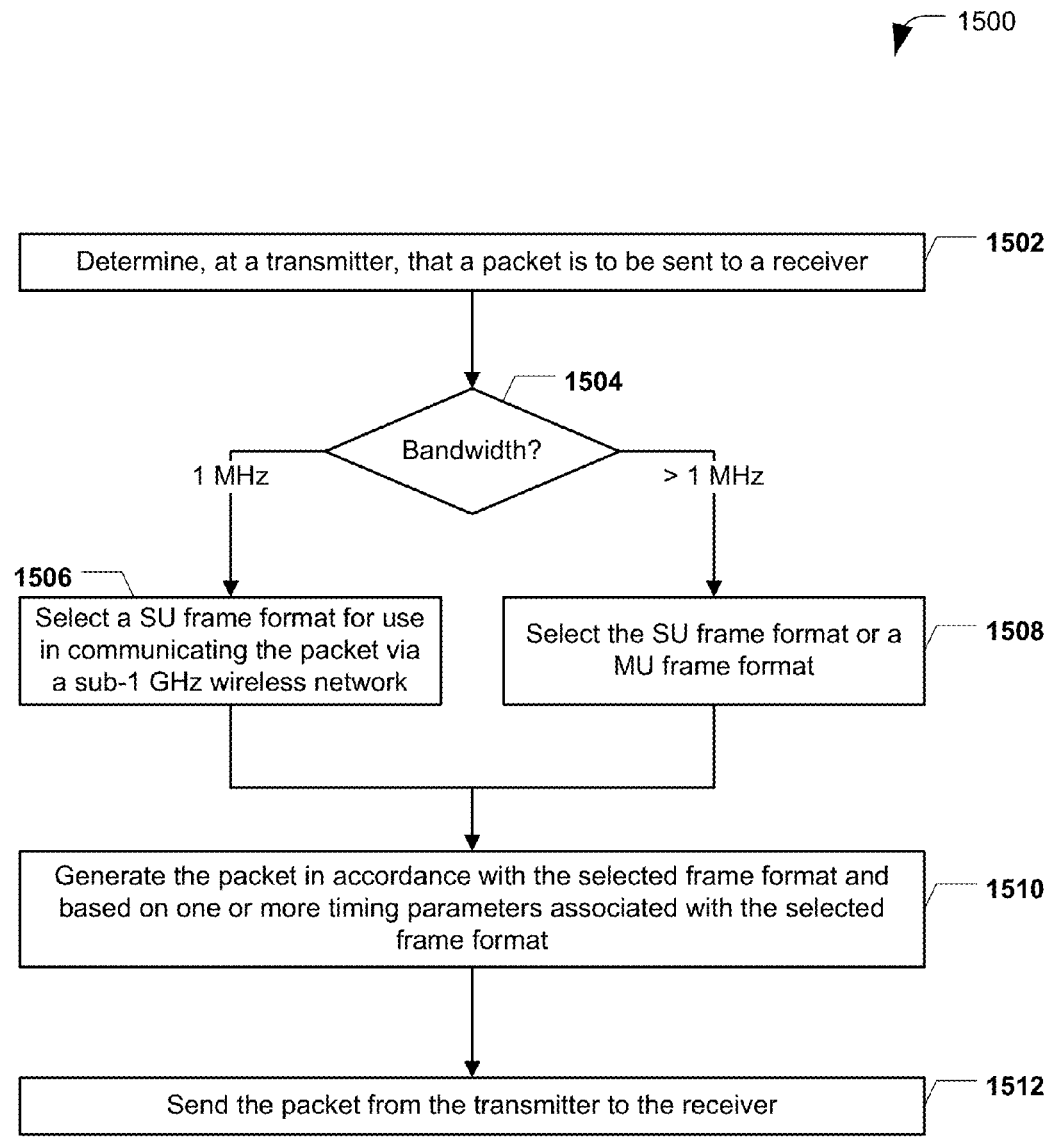
FIG. 15 is a flowchart of a particular embodiment of a method of controlling a frame format and timing parameters in a sub-1 GHz wireless network.

FIG. 15 is a flowchart of a particular embodiment of a method 1500 of controlling a frame format and timing parameters in a sub-1 GHz wireless network. In an illustrative embodiment, the method 1500 may be performed by the transmitter 110 of FIG. 1.

The method 1500 may include determining, at a transmitter, that a packet is to be sent to a receiver, at 1502, and determining a wireless network bandwidth, at 1504. For example, in FIG. 1, the transmitter 110 may determine that the packet 130 is to be sent to the receiver 120 and may determine (e.g., based on information from an access point or examination of messaging data) the bandwidth of the sub-1 GHz wireless network 140.

When the bandwidth is 1 MHz, the method 1500 may include selecting a SU frame format for use in communicating the packet, at 1506. For example, the SU frame format may be the SU frame format 1310 of FIG. 13. When the bandwidth is greater than 1 MHz, the method 1500 may include selecting the SU frame format or a MU frame format, at 1508. For example, the MU frame format may be the MU frame format 1320 of FIG. 13.

The method 1500 may also include generating the packet in accordance with the selected frame format and based on one or more timing parameters associated with the selected frame format, at 1510. For example, the timing parameters may be one or more of the timing parameters 1400 of FIG. 14. The method 1500 may further include sending the packet from the transmitter to the receiver, at 1512. For example, in FIG. 1, the transmitter 110 may send the packet 130 to the receiver 120.

FIG. 16 illustrates particular examples of tone scaling parameters 1600. In an illustrative embodiment, the tone scaling parameters 1600 may be the tone scaling parameters 113 and/or the tone scaling parameters 123 of FIG. 1.

When a packet (e.g., the packet 130 of FIG. 1) is generated, one or more fields of the packet may be scaled by one or more tone scaling parameters. Different tone scaling parameters may be applied to different fields of the same packet. In particular embodiment, tone scaling parameters may be a function of frame format (e.g., whether the packet is in the SU frame format 1310 of FIG. 13 or the MU frame format 1320 of FIG. 13), bandwidth, and/or number of spatial streams in use.

For example, the tone scaling parameters 1600 may include parameters for the SU frame format at 1 MHz, 2 MHz, 4 MHz, 8 MHz, and 16 MHz bandwidths, including a STF tone scaling parameter, a LTF_1 tone scaling parameter, a SIG field tone scaling parameter, and a data portion tone scaling parameter. A multiple-input multiple-output LTF (MIMO-LTF) tone scaling parameter may also be applied when more than one spatial stream is in use. At 1 MHz bandwidth, the SIG field and the data portion may have the same number of available tones, and therefore the same tone scaling parameter. At higher bandwidths, the SIG field may be generated by repeating a lower bandwidth SIG field. Thus, the SIG field tone scaling parameter may double (e.g., from 26 to 52, 104, 208, and 416) as the bandwidth doubles (e.g., from 1 MHz to 2 MHz, 4 MHz, 8 MHz, and 16 MHz), as shown in FIG. 16. However, the data portion tone scaling parameter may not double. Thus, the SIG field tone scaling parameter and the data portion tone scaling parameter may be different for some bandwidths.

As explained above with reference to FIG. 13, the MU frame format may not be available at 1 MHz bandwidth. In FIG. 16, the tone scaling parameters 1600 for the MU frame format at 1 MHz are shaded to indicate this unavailability. For the MU frame format at bandwidths greater than 1 MHz, the tone scaling parameters 1600 may include a STF tone scaling parameter, a LTF_1 tone scaling parameter, a SIG-A field tone scaling parameter, a SIG-B field tone scaling parameter, a data portion tone scaling parameter, and a MU-STF tone scaling parameter. A MIMO-LTF tone scaling parameter may also be applied when more than one spatial stream is in use. The SIG-A field tone scaling parameter may double as the bandwidth doubles, but the SIG-B field tone scaling parameter and the data portion tone scaling parameter may not double. Thus, the SIG-A field tone scaling parameter may be different than the data portion tone scaling parameter for some bandwidths. The SIG-B tone scaling parameter may be the same as the data portion tone scaling parameter for each bandwidth, as shown in FIG. 16.

Figure 17:
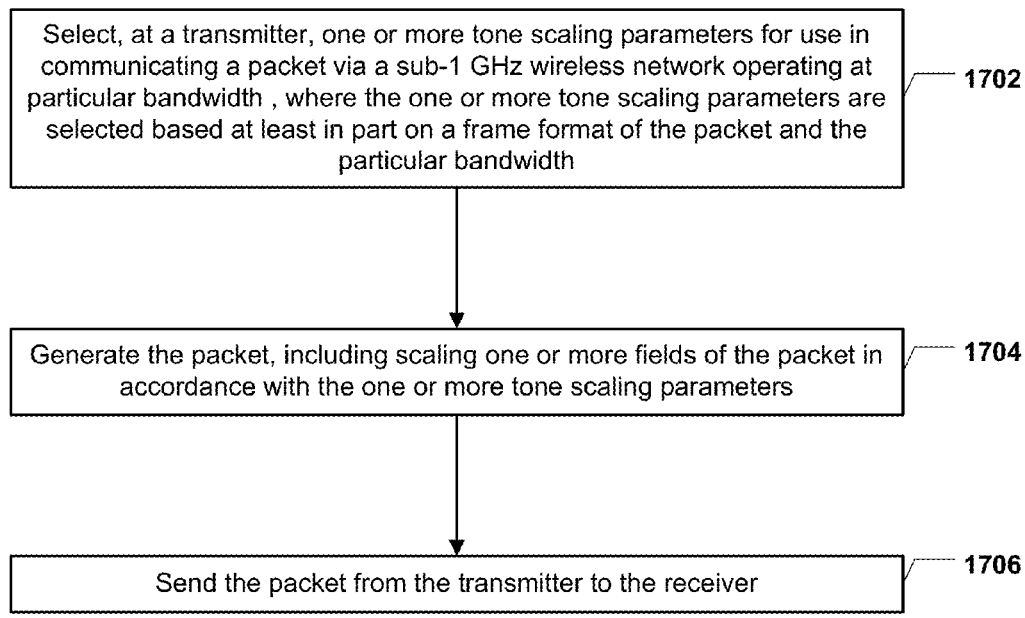
FIG. 17 is a flowchart of a particular embodiment of a method of controlling tone scaling parameters in a sub-1 GHz wireless network.

FIG. 17 is a flowchart of a particular embodiment of a method 1700 of controlling tone scaling parameters in a sub-1 GHz wireless network. In an illustrative embodiment, the method 1700 may be performed by the transmitter 110 of FIG. 1.

The method 1700 may include selecting, at a transmitter, one or more tone scaling parameters for use in communicating a packet via a sub-1 GHz wireless network operating at a particular bandwidth, at 1702. The one or more tone scaling parameters may be selected based at least in part on a frame format of the packet and the particular bandwidth. For example, in FIG. 1, the transmitter 110 may select one or more of the tone scaling parameters 113. In an illustrative embodiment, the tone scaling parameters may be one or more of the tone scaling parameters 1600 of FIG. 16.

The method 1700 may also include generating the packet, including scaling one or more fields of the packet in accordance with the one or more tone scaling parameters, at 1704. For example, fields such as STF, LTF_1, SIG, MIMO-LTF, and/or data may be scaled by tone scaling parameters when the packet is a SU frame format packet and the bandwidths is greater than or equal to 1 MHz. As another example, fields such as STF, LTF_1, SIG-A, MU-STF, MIMO-LTF, SIG-B, and/or data may be scaled when the packet is a MU frame format packet and the bandwidth is greater than 1 MHz.

The method 1700 may further include sending the packet from the transmitter to the receiver, at 1706. For example, in FIG. 1, the transmitter 110 may send the packet 130 to the receiver 120.

It should be noted although various data structures have been shown and described as tables, other types of data structures may be used in conjunction with the described techniques. Moreover, some data structures may be combined while others may be split. For example, instead of using a different MCS table for each bandwidth/spatial stream combination, a particular embodiment may utilize a single MCS table that is indexed by bandwidth, number of spatial streams, and MCS index. As another example, instead of using a single timing parameter table or tone scaling parameter table, multiple tables may be used (e.g., different tables for each bandwidth, frame format, or bandwidth/frame format combination). Thus, more, fewer, and/or different types of data structures than those illustrated may be used in conjunction with the described techniques.

Figure 18:
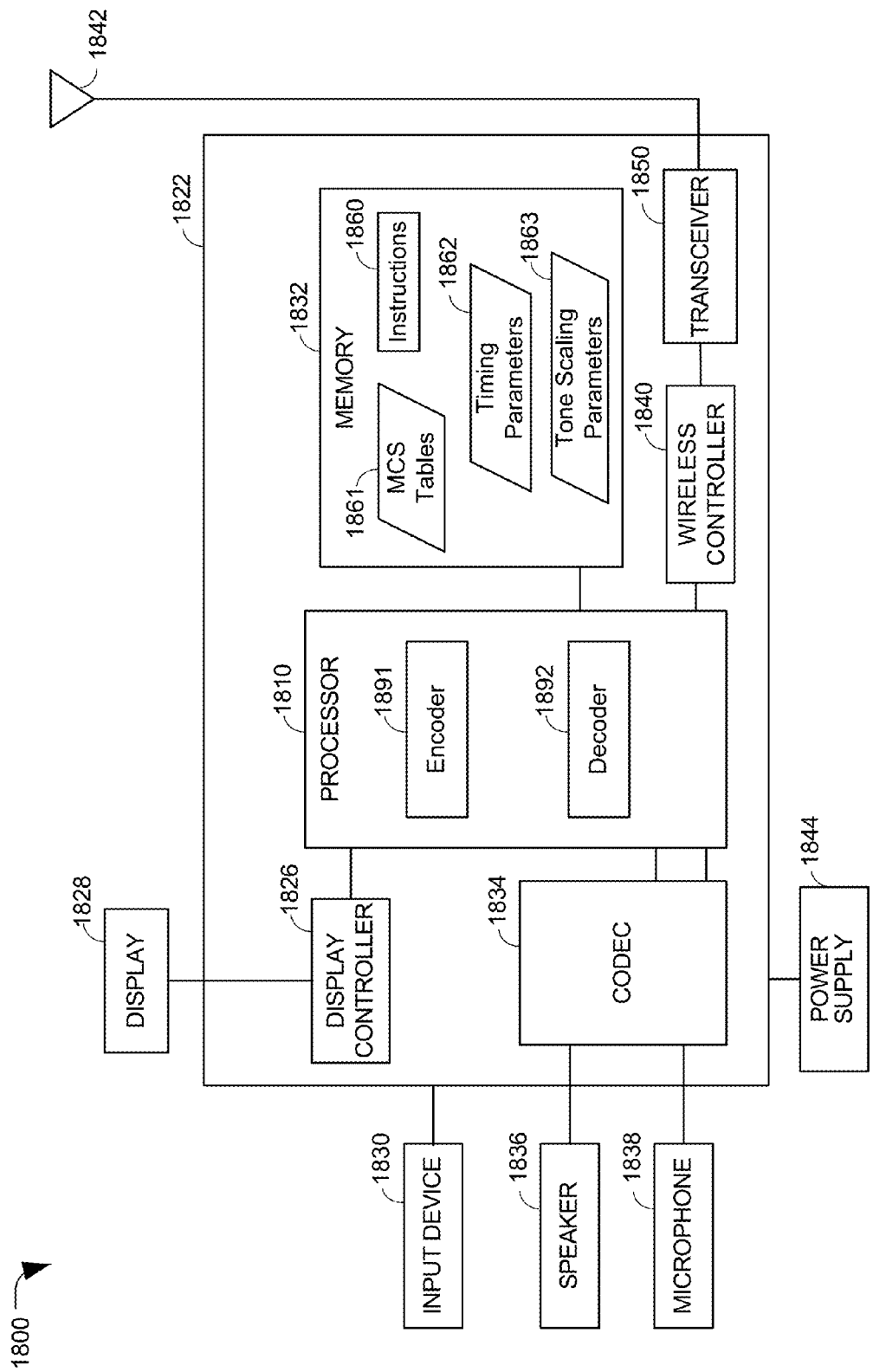
FIG. 18 is a block diagram of a mobile communication device including components that are operable to control characteristics of messages in a sub-1 GHz wireless network.

FIG. 18 is a block diagram of a mobile communication device 1800. In a particular embodiment, the mobile communication device 1800, or components thereof, include or are included within the transmitter 110 FIG. 1, the receiver 120 of FIG. 1, a transceiver, or any combination thereof. Further, all or part of the methods described in FIGS. 11, 12, 15, and/or 17 may be performed at or by the mobile communication device 1800, or components thereof. The mobile communication device 1800 includes a processor 1810, such as a digital signal processor (DSP), coupled to a memory 1832.

The memory 1832 may be a non-transitory tangible computer-readable and/or processor-readable storage device that stores instructions 1860. The instructions 1860 may be executable by the processor 1810 to perform one or more functions or methods described herein, such as the methods described with reference to FIGS. 11, 12, 15, and/or 17. The memory 1832 may also store MCS tables 1861, timing parameters 1862, and tone scaling parameters 1863. The MCS tables 1861 may include the MCS tables 111 of FIG. 1, the MCS tables 121 of FIG. 1, the MCS tables illustrated in FIGS. 2-10, or any combination thereof. The timing parameters 1862 may include the timing parameters 112 of FIG. 1, the timing parameters 122 of FIG. 1, the timing parameters 1400 of FIG. 14, or any combination thereof. The tone scaling parameters 1863 may include the tone scaling parameters 113 of FIG. 1, the tone scaling parameters 123 of FIG. 1, the tone scaling parameters 1600 of FIG. 16, or any combination thereof.

The processor 1810 may also include, implement, or execute instructions related to device components described herein. For example, the processor 1810 may include or implement an encoder 1891 (e.g., the packet creator/encoder 114 of FIG. 1) and/or a decoder 1892 (e.g., the packet extractor/decoder 124 of FIG. 1).

FIG. 18 also shows a display controller 1826 that is coupled to the processor 1810 and to a display 1828. A coder/decoder (CODEC) 1834 can also be coupled to the processor 1810. A speaker 1836 and a microphone 1838 can be coupled to the CODEC 1834. FIG. 18 also indicates that a wireless controller 1840 can be coupled to the processor 1810, where the wireless controller 1840 is in communication with an antenna 1842 via a transceiver 1850. The wireless controller 1840, the transceiver 1850, and the antenna 1842 may thus represent a wireless interface that enables wireless communication by the mobile communication device 1800. For example, the wireless communication may be via a sub-1 GHz wireless network (e.g., an IEEE 802.11ah wireless network), such as the wireless network 140 of FIG. 1. Such a wireless interface may be used to send or receive the packet 130 of FIG. 1. The mobile communication device 1800 may include numerous wireless interfaces, where different wireless networks are configured to support different networking technologies or combinations of networking technologies.

It should be noted that although FIG. 18 illustrates a mobile communication device, other types of devices may communicate via a sub-1 GHz wireless network (e.g., an IEEE 802.11ah wireless network). Some devices may include more, fewer, and/or different components than those illustrated in FIG. 18. For example, an IEEE 802.11ah wireless sensor may not include the display 1828, the speaker 1836, or the microphone 1838.

In a particular embodiment, the processor 1810, the display controller 1826, the memory 1832, the CODEC 1834, the wireless controller 1840, and the transceiver 1850 are included in a system-in-package or system-on-chip device 1822. In a particular embodiment, an input device 1830 and a power supply 1844 are coupled to the system-on-chip device 1822. Moreover, in a particular embodiment, as illustrated in FIG. 18, the display device 1828, the input device 1830, the speaker 1836, the microphone 1838, the antenna 1842, and the power supply 1844 are external to the system-on-chip device 1822. However, each of the display device 1828, the input device 1830, the speaker 1836, the microphone 1838, the antenna 1842, and the power supply 1844 can be coupled to a component of the system-on-chip device 1822, such as an interface or a controller.

In conjunction with the described embodiments, an apparatus includes means for storing one or more data structures. The one or more data structures indicate timing parameters for a plurality of frame formats and a plurality of bandwidths of a sub-one gigahertz wireless network. For example, the means for storing may include a component (e.g., a memory or data storage device) of the transmitter 110 of FIG. 1, a component (e.g., a memory or data storage device) of the receiver 120 of FIG. 1, the memory 1832 of FIG. 18, another device configured to store data, or any combination thereof. The apparatus also includes means for selecting a frame format for use in communicating a packet via the sub-one gigahertz wireless network operating at a particular bandwidth. The frame format is selected based at least in part on the particular bandwidth. For example, the means for selecting may include the packet creator/encoder 114 of FIG. 1, the packet extractor/decoder 124 of FIG. 1, the processor 1810 of FIG. 18, the encoder 1891 of FIG. 18, the decoder 1892 of FIG. 18, another device configured to select a frame format, or any combination thereof.

The apparatus further includes means for determining one or more timing parameters based on the selected frame format and the particular bandwidth. For example, the means for determining may include the packet creator/encoder 114 of FIG. 1, the packet extractor/decoder 124 of FIG. 1, the processor 1810 of FIG. 18, the encoder 1891 of FIG. 18, the decoder 1892 of FIG. 18, another device configured to determine timing parameter(s), or any combination thereof. The apparatus includes means for generating the packet in accordance with the selected frame format and the one or more timing parameters. For example, the means for generating may include the packet creator/encoder 114 of FIG. 1, the packet extractor/decoder 124 of FIG. 1, the processor 1810 of FIG. 18, the encoder 1891 of FIG. 18, the decoder 1892 of FIG. 18, another device configured to generate a packet, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
   selecting, at a transmitter, a frame format for use in communicating a packet via a sub-one gigahertz wireless network operating at a particular bandwidth, wherein the frame format is selected based at least in part on the particular bandwidth;
   determining one or more timing parameters based on the selected frame format and the particular bandwidth;
   generating the packet in accordance with the selected frame format and the one or more timing parameters; and
   sending the packet from the transmitter to a receiver,
   wherein the selected frame format is a first frame format when the particular bandwidth is one megahertz,
   wherein the selected frame format is the first frame format or a second frame format when the particular bandwidth is greater than one megahertz, wherein the second frame format comprises a first portion and a second portion, wherein the first portion comprises an omni portion comprising a short training field (STF), a first long training field (LTF), and a signal A field (SIG-A), and wherein the second portion comprises a data portion comprising a second STF, one or more signal B fields (SIG-Bs), and a data field.

2. The method of claim 1, wherein the sub-one gigahertz wireless network operates in accordance with an Institute of Electrical and Electronics Engineers (IEEE) 802.11ah protocol.

3. The method of claim 1, wherein the first frame format comprises a short training field (STF), a long training field (LTF), a signal field (SIG), and a data portion.

4. The method of claim 3, wherein when more than one spatial stream is in use, the first frame format further comprises one or more additional LTFs.

5. The method of claim 1, wherein when more than one spatial stream is in use, the second frame format further comprises one or more additional LTFs.

6. The method of claim 1, wherein the particular bandwidth comprises 1 megahertz (MHz), 2 MHz, 4 MHz, 8 MHz, or 16 MHz.

7. The method of claim 1, wherein the one or more timing parameters include:
   a number of complex data subcarriers;
   a number of pilot subcarriers;
   a number of total subcarriers excluding guards;
   a highest data subcarrier index;
   a subcarrier frequency spacing;
   a discrete Fourier transform (DFT) period;
   an inverse DFT (IDFT) period;
   a guard interval duration;
   a double guard interval duration;
   a short guard interval duration;
   an orthogonal frequency-division multiplexing (OFDM) symbol duration with long guard intervals;
   an OFDM symbol duration with short guard intervals;
   an OFDM symbol duration;
   a number of bits in a SERVICE field;
   a number of tail bits per binary convolution code encoder;
   a short training field (STF) duration;
   a long training field (LTF) duration;
   a signal field (SIG) duration;
   a signal A field (SIG-A) duration;
   a multiple-input multiple-output LTF (MIMO-LTF) duration;
   a long format STF duration;
   a signal B field (SIG-B) duration;
   or any combination thereof.

8. The method of claim 7, wherein the STF duration, the LTF duration, and one of the SIG duration and the SIG-A duration are each longer when the particular bandwidth is one megahertz than when the particular bandwidth is greater than one megahertz.

9. The method of claim 7, wherein:
   the subcarrier frequency spacing is 31.25 kilohertz (KHz);
   the DFT period is 32 microseconds ($\mu$s);
   the IDFT period is 32 $\mu$s;
   the guard interval duration is 8 $\mu$s;
   a double guard interval duration is 16 $\mu$s;
   a short guard interval duration is 4 $\mu$s;
   the OFDM symbol duration with long guard intervals is 40 $\mu$s;
   an OFDM symbol duration with short guard intervals is 36 $\mu$s;
   the OFDM symbol duration is 40 $\mu$s or 36 $\mu$s;

the number of bits in the SERVICE field is 16;
the number of tail bits per binary convolution code encoder is 6; and
the MIMO-LTF duration is 40 μs.

10. The method of claim 7, wherein when the particular bandwidth is 1 megahertz (MHz):
the number of complex data subcarriers is 24;
the number of pilot subcarriers is 2;
the number of total subcarriers excluding guards is 26;
the highest data subcarrier index is 13;
the STF duration is 160 microseconds (μs);
the LTF duration is 160 μs; and
the SIG duration is 240 μs or 200 μs.

11. The method of claim 7, wherein when the particular bandwidth is greater than 1 megahertz (MHz):
the STF duration is 80 microseconds (μs);
the LTF duration is 8 μs;
the SIG duration is 80 μs;
the SIG-A duration is 80 μs;
the long format STF duration is 40 μs; and
the SIG-B duration is 40 μs.

12. The method of claim 7, wherein when the particular bandwidth is 2 megahertz (MHz):
the number of complex data subcarriers is 52;
the number of pilot subcarriers is 4;
the number of total subcarriers excluding guards is 56; and
the highest data subcarrier index is 28.

13. The method of claim 7, wherein when the particular bandwidth is 4 megahertz (MHz):
the number of complex data subcarriers is 108;
the number of pilot subcarriers is 6;
the number of total subcarriers excluding guards is 114; and
the highest data subcarrier index is 58.

14. The method of claim 7, wherein when the particular bandwidth is 8 megahertz (MHz):
the number of complex data subcarriers is 234;
the number of pilot subcarriers is 8;
the number of total subcarriers excluding guards is 242; and
the highest data subcarrier index is 122.

15. The method of claim 7, wherein when the particular bandwidth is 16 megahertz (MHz):
the number of complex data subcarriers is 468;
the number of pilot subcarriers is 16;
the number of total subcarriers excluding guards is 484; and
the highest data subcarrier index is 250.

16. A non-transitory processor-readable medium storing:
one or more data structures, the one or more data structures indicating timing parameters for a first frame format and a second frame format of a sub-one gigahertz wireless network for each of a plurality of operating bandwidths of the sub-one gigahertz wireless network, wherein a first operating bandwidth of one megahertz is associated with the first frame format, wherein a second operating bandwidth that is greater than one megahertz is associated with the first frame format or the second frame format, wherein the second frame format comprises a first portion and a second portion, wherein the first portion comprises an omni portion comprising a short training field (STF), a first long training field (LTF), and a signal A field (SIG-A), and wherein the second portion comprises a data portion comprising a second STF, one or more signal B fields (SIG-Bs), and a data field;
wherein the timing parameters include:
a number of complex data subcarriers;
a number of pilot subcarriers;
a number of total subcarriers excluding guards;
a highest data subcarrier index;
a subcarrier frequency spacing;
an inverse discrete Fourier transform period;
a discrete Fourier transform period;
a guard interval duration;
a double guard interval duration;
a short guard interval duration;
an orthogonal frequency-division multiplexing (OFDM) symbol duration with long guard intervals;
an OFDM symbol duration with short guard intervals;
an OFDM symbol duration;
a number of bits in a SERVICE field;
a number of tail bits per binary convolution code encoder;
a short training field (STF) duration;
a long training field (LTF) duration;
a signal field (SIG) duration;
a signal A field (SIG-A) duration;
a multiple-input multiple-output LTF (MIMO-LTF) duration;
a long format STF duration;
a signal B field (SIG-B) duration;
or any combination thereof.

17. An apparatus comprising:
a memory storing one or more data structures, the one or more data structures indicating timing parameters for a plurality of frame formats and a plurality of bandwidths of a sub-one gigahertz wireless network; and
a processor coupled to the memory, the processor configured to:
select a frame format for use in communicating a packet via the sub-one gigahertz wireless network operating at a particular bandwidth, wherein the frame format is selected based at least in part on the particular bandwidth;
determine one or more timing parameters based on the selected frame format and the particular bandwidth; and
generate the packet in accordance with the selected frame format and the one or more timing parameters,
wherein the selected frame format is a first frame format when the particular bandwidth is one megahertz, and
wherein the selected frame format is the first frame format or a second frame format when the particular bandwidth is greater than one megahertz, wherein the second frame format comprises a first portion and a second portion, wherein the first portion comprises an omni portion comprising a short training field (STF), a first long training field (LTF), and a signal A field (SIG-A), and wherein the second portion comprises a data portion comprising a second STF, one or more signal B fields (SIG-Bs), and a data field.

18. The apparatus of claim 17, wherein the sub-one gigahertz wireless network operates in accordance with an Institute of Electrical and Electronics Engineers (IEEE) 802.11ah protocol.

19. An apparatus comprising:
means for storing one or more data structures, the one or more data structures indicating timing parameters for a plurality of frame formats and a plurality of bandwidths of a sub-one gigahertz wireless network;
means for selecting a frame format for use in communicating a packet via the sub-one gigahertz wireless network operating at a particular bandwidth, wherein the frame format is selected based at least in part on the particular bandwidth;
means for determining one or more timing parameters based on the selected frame format and the particular bandwidth; and
means for generating the packet in accordance with the selected frame format and the one or more timing parameters,
wherein the selected frame format is a first frame format when the particular bandwidth is one megahertz,
wherein the selected frame format is the first frame format or a second frame format when the particular bandwidth is greater than one megahertz, wherein the second frame format comprises a first portion and a second portion, wherein the first portion comprises an omni portion comprising a short training field (STF), a first long training field (LTF), and a signal A field (SIG-A), and wherein the second portion comprises a data portion comprising a second STF, one or more signal B fields (SIG-Bs), and a data field.

* * * * *